United States Patent

Herring et al.

[19]

[11] Patent Number: 5,807,016
[45] Date of Patent: Sep. 15, 1998

[54] CONNECTION OF WINDSHIELD WIPER BLADES

[75] Inventors: Richard Allen Herring, Granger; Alan Jeffrey Stahlhut, Valparaiso; William Arthur Powell, Winamac; James Patrick Witek, Michigan City, all of Ind.

[73] Assignee: Cooper Technologies Company, Houston, Tex.

[21] Appl. No.: 787,394

[22] Filed: Jan. 22, 1997

Related U.S. Application Data

[63] Continuation-in-part of Ser. No. 746,270, Nov. 8, 1996.
[51] Int. Cl.$^6$ ........................................... B25G 3/18
[52] U.S. Cl. ........................... 403/321; 403/3; 15/250.31; 15/250.32
[58] Field of Search .................. 403/321, 3, 4; 15/250.32, 250.351, 250.31

[56] References Cited

U.S. PATENT DOCUMENTS

| | | | |
|---|---|---|---|
| 3,408,680 | 11/1968 | Heller | 15/250.42 |
| 3,641,614 | 2/1972 | Newsome | 15/250.32 |
| 3,942,212 | 3/1976 | Steger et al. | 15/250.42 |
| 4,023,232 | 5/1977 | Smithers | 15/250.32 |
| 4,127,912 | 12/1978 | Deibel et al. | 15/250.42 |
| 4,179,766 | 12/1979 | Weiler et al. | 15/250.32 |
| 4,290,164 | 9/1981 | van den Berg | 15/250.32 |
| 4,296,521 | 10/1981 | Mower | 15/250.32 |
| 4,343,062 | 8/1982 | van den Berg | 15/250.32 |
| 4,443,907 | 4/1984 | Chamberlain | 15/250.32 |
| 4,578,839 | 4/1986 | Nishikawa | 15/250.32 |
| 4,878,263 | 11/1989 | Raymond | 15/250.32 |
| 5,070,573 | 12/1991 | Journee et al. | 15/250.32 |
| 5,084,933 | 2/1992 | Buechele | 15/250.32 |
| 5,136,748 | 8/1992 | Naruke et al. | 15/250.32 |
| 5,168,597 | 12/1992 | Schon et al. | 15/250.32 |
| 5,289,608 | 3/1994 | Kim | 15/250.32 |
| 5,332,328 | 7/1994 | Yang | 403/154 |
| 5,392,487 | 2/1995 | Yang | 15/250.32 |
| 5,435,041 | 7/1995 | Ho | 15/250.32 |
| 5,606,765 | 3/1997 | Ding | 15/250.32 |
| 5,611,103 | 3/1997 | Lee | 15/250.32 |
| 5,618,124 | 4/1997 | Chen | 403/3 |
| 5,632,059 | 5/1997 | Lee | 15/250.32 |

FOREIGN PATENT DOCUMENTS

| | | | |
|---|---|---|---|
| 329515 | 8/1989 | European Pat. Off. | 15/250.32 |
| 2377302 | 9/1978 | France | 15/250.32 |
| 3222891 | 12/1983 | Germany | 15/250.32 |
| 611563 | 6/1979 | Sweden | 15/250.32 |

OTHER PUBLICATIONS

"Wiper Blade—Fits Most Import & Domestic Cars and Light Trucks," Saver, Stk No. 10–182 (xerox copy of product), purchased Jul., 1997.

Drawings of connector included with reference AQ, purchased Jul., 1997.

Cooper Industries, Anco Division, "Anco Instructions —Installation —20–11, 33–18," No. 85374 (1995).

(List continued on next page.)

*Primary Examiner*—Kenneth J. Dorner
*Assistant Examiner*—William Miller
*Attorney, Agent, or Firm*—Fish & Richardson P.C.

[57] ABSTRACT

A windshield wiper blade assembly system includes a windshield wiper blade assembly and an adapter. The assembly includes a connector configured to be connected to a first type of windshield wiper arm, such as a hookslot wiper arm having a smaller hook. The assembly also includes a blade carrier attached to the connector, and a wiper blade attached to the blade carrier. The adapter is configured to be attached to the connector to permit connection of the windshield wiper blade assembly to a second type of windshield wiper arm, such as a hookslot wiper arm having a larger hook, without detaching the carrier from the connector. The connector may be configured for attachment to pin-type wiper arms as well as hookslot wiper arms. The adapter may be configured for attachment to straight wiper arms.

45 Claims, 20 Drawing Sheets

OTHER PUBLICATIONS

Cooper Industries, Anco Division, "Instructions —Removal —Installation –N–16R —N–21R" (1994).

Cooper Industries, Anco Division, "Anco Instructions —Installation —25–16 —24–24, 31–17, 31–19, 90–16 —90–22A," No. 85360A (1994).

Cooper Industries, Anco Division, "Instructions —T Series —Removal —Installation," No. 86001 (1995).

Cooper Industries, Anco Division, "Instructions —U15r —U24R —Removal —Installation," No. G85370B (1995).

Cooper Industries, Anco Division, "Rainy Day Instructions —Removal —Installation —Anco Advantage & Trico, Tridon, Bosch II," No. 85363 (1994).

Cooper Industries, Anco Division, "Pantograph Arms —1/4–28 Screw Shaft Arm —1/2 Inch and 5/8 Inch Serrated Drum Shaft Arm —Universal Adjustable Wiper Arms," No. 94121 (Mar. 1992).

Cooper Industries, Anco Division, "Anco Instructions —Installation —22–18, 25–12 —25–15, 31–12," No. 85357A (1995).

Cooper Industries, Anco Division, "Anco Instructions —Installation —29–16 —29–24, 30–15 —30–18," No. 85359 (1994).

Cooper Industries, Anco Division, "Instructions —N Series —Removal —Installation," No. 86000 (1995).

Cooper Industries, Anco Division, "Instructions —11–13 —11–22 —Removal —Installation," No. 85365A (1994).

Cooper Industries, Anco Division, "Installation —Audi, Saturn, Bosch, N–22R" (1994).

Cooper Industries, Anco Division, "Rainy Day Instructions —Installation —RD16 —RDB19," No. 85393 (1994).

NAPA Windshield Products, instructions for removal and installation of wiper blades, No. 5674–6 (1993) (U.S. Patent 4,127,912).

Tridon, instruction sheet regarding U.S. Patent Nos. 3,942,212 and 3,408,680.

NAPA Windshield Products, removal and installation instructions for 16" wiper blades, No. 5673–6 (Mar. 1993) (U.S. Patent 4,127,912).

Removal and installation instructions for wiper blades, No. V–5912–27 (Nov. 1992).

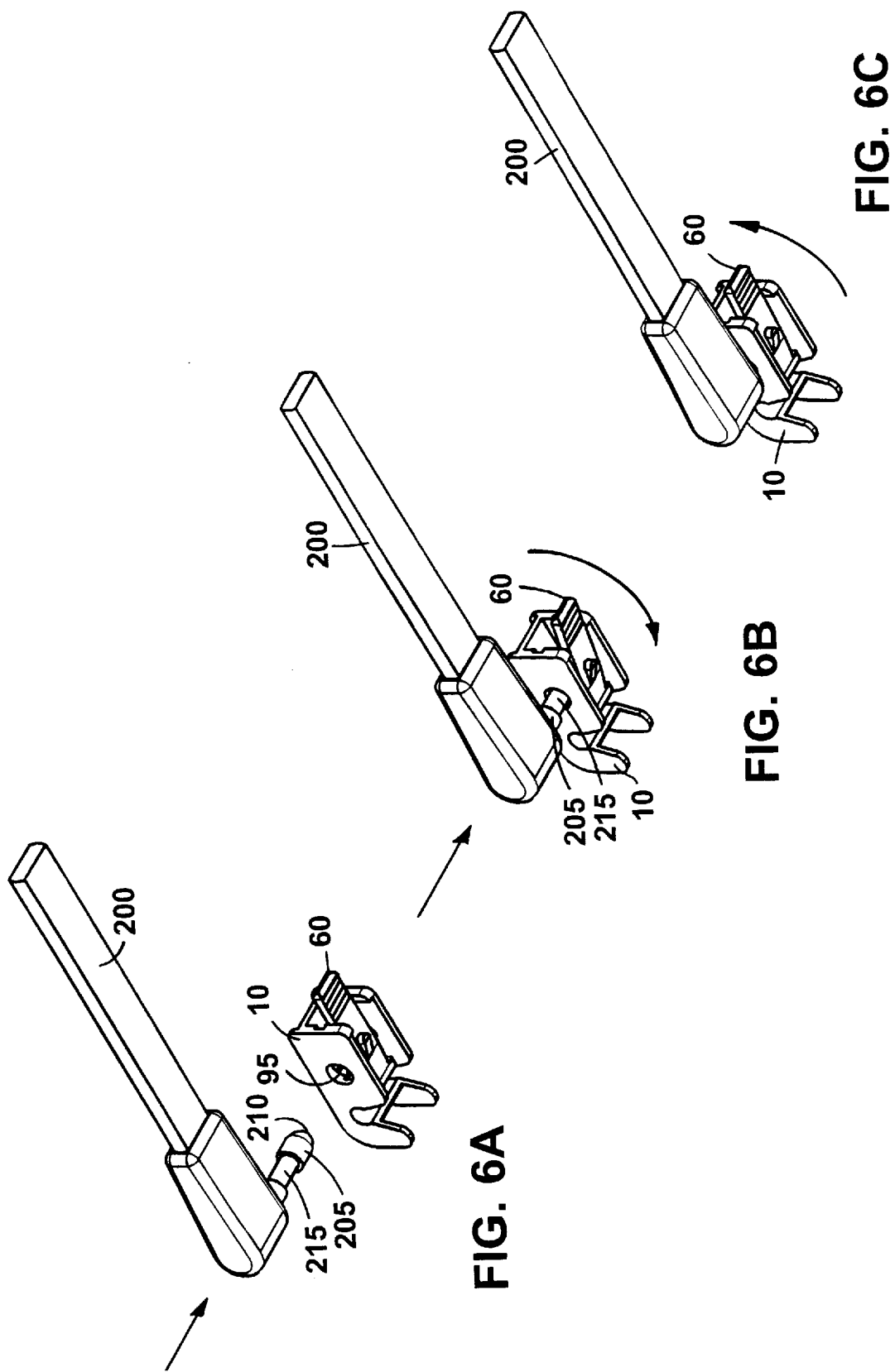

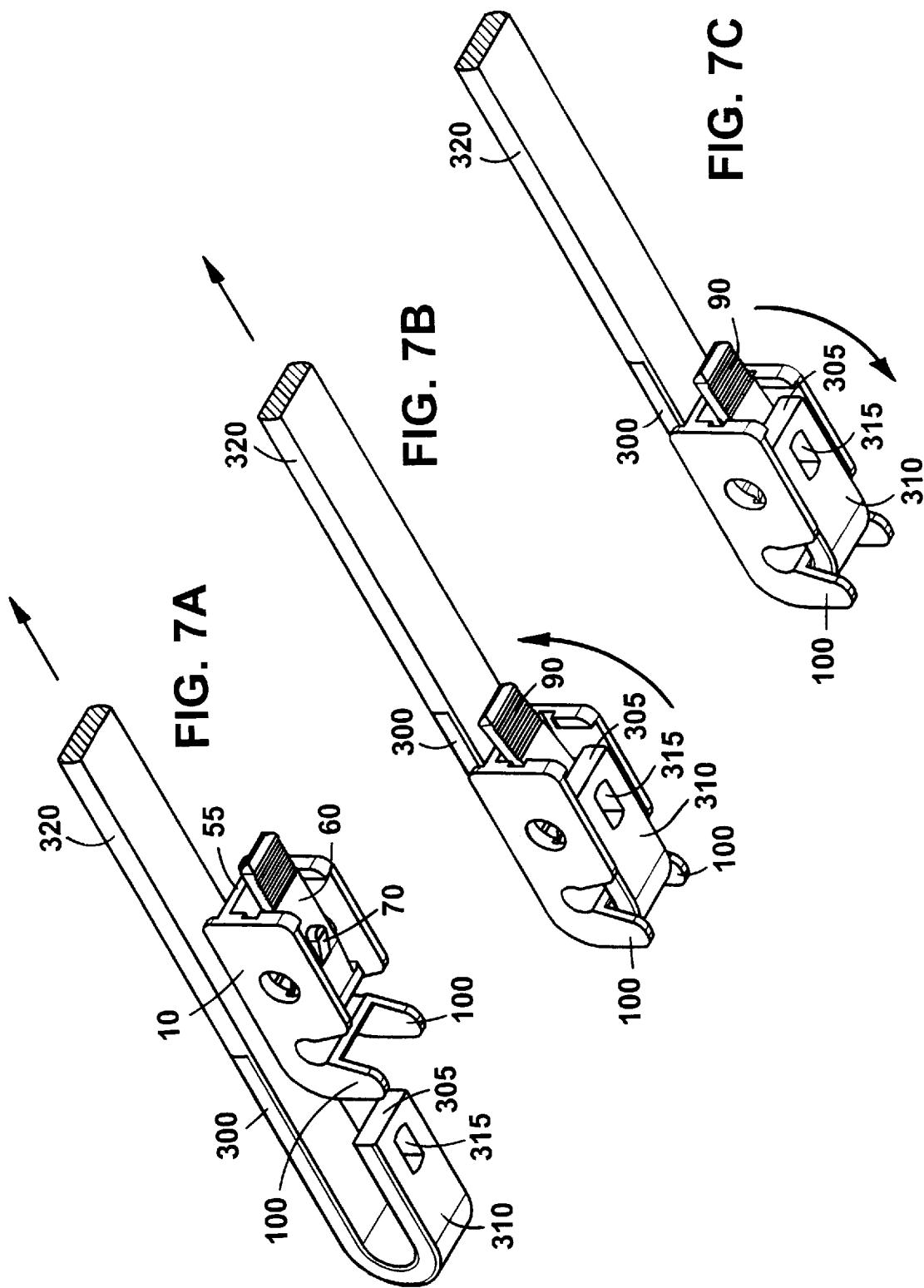

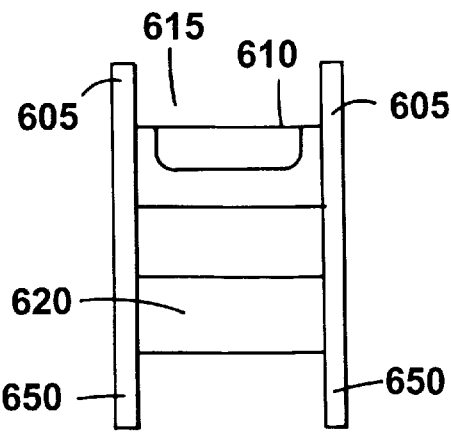
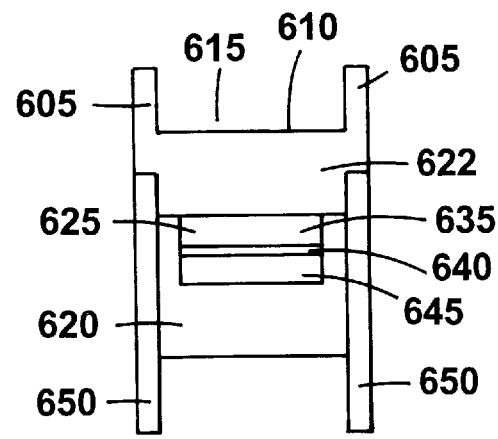
FIG. 11E   FIG. 11F
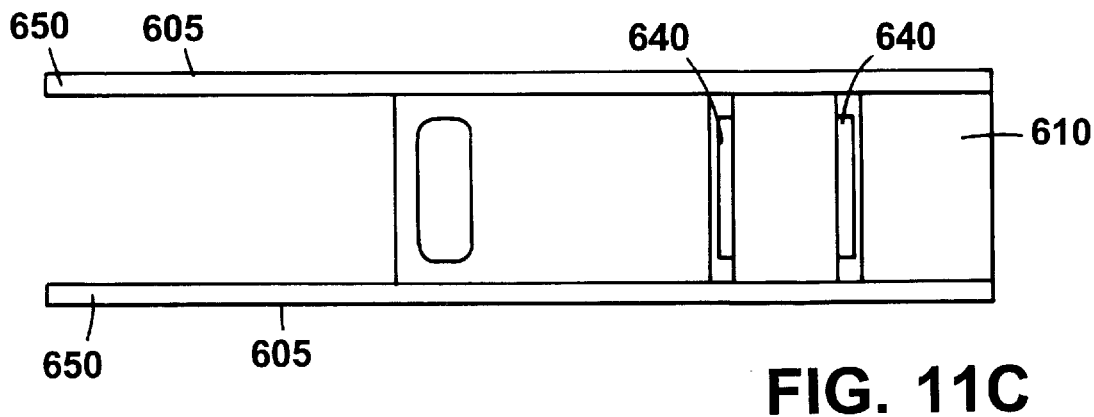
FIG. 11C
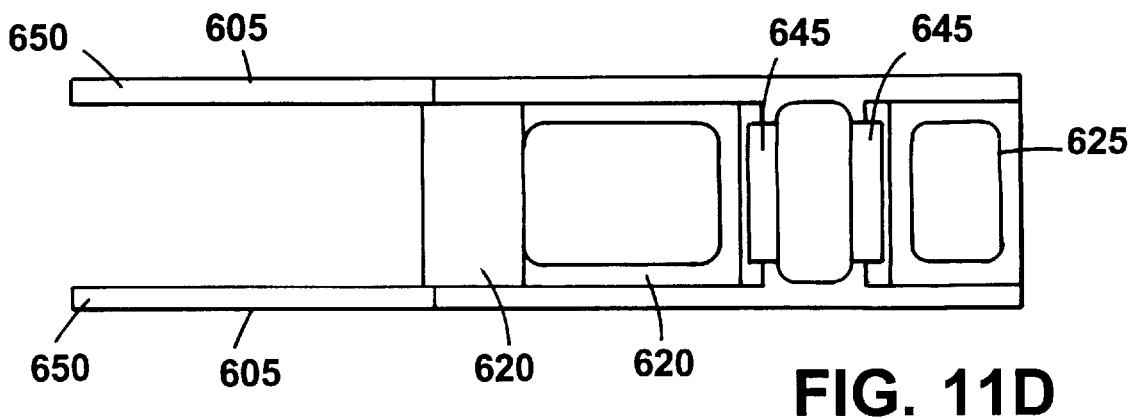
FIG. 11D

CONNECTION OF WINDSHIELD WIPER BLADES

CROSS REFERENCE TO RELATED APPLICATION

This application is a continuation-in-part of U.S. application Ser. No. 08/746,270, filed Nov. 8, 1996 and entitled "WINDSHIELD WIPER BLADE CONNECTOR", which is incorporated herein by reference.

BACKGROUND OF THE INVENTION

The invention relates to connection of windshield wiper blades to wiper arms.

In general, the primary types of wiper arms for automotive windshield wipers include pin-type arms, hookslot arms, and straight arms. A wiper blade assembly may be connected to a pin-type arm by inserting a pin of the pin-type arm through a hole in a connector of the wiper blade assembly. A wiper blade assembly may be connected to a hookslot arm by sliding a hook of the hookslot arm over a connector of the wiper blade assembly until a tab of the connector locks within a slot of the hookslot arm. A wiper blade assembly may be connected to a straight arm by sliding the straight arm into a connector of the wiper blade assembly.

Each type of wiper arm may come in a variety of sizes. For example, pin-type arms typically include 3/16 or 1/4 inch diameter pins. Similarly, hookslot arms may have hook thicknesses of 2.5 mm, 2.8 mm, 3.0 mm, 3.2 mm, 3.5 mm or 4 mm. The hooks also may come in different lengths.

Aftermarket windshield wiper blades typically are sold for use with several different wiper arm configurations. For this reason, manufacturers of such aftermarket blades typically produce a standard blade assembly and provide an assortment of connectors for use in adapting the standard blade assembly to different wiper arm configurations. A purchaser of the blade assembly then attaches the appropriate connector to the blade assembly before attaching the assembly to a wiper arm. In many instances, the blade assembly is sold with a connector for a common wiper arm configuration already attached. The purchaser may need to remove this connector before attaching a connector suitable for the purchaser's wiper arm configuration.

SUMMARY OF THE INVENTION

A process for connection of windshield wiper blades is provided. The process permits connection of a particular wiper blade assembly to different types of wiper arm configurations without requiring removal or replacement of a connector originally attached to the wiper blade assembly. This promises to eliminate considerable consumer frustration that is associated with removing and replacing connectors. The process uses multi-purpose wiper blade connectors and other components to permit a small number (e.g., two) of wiper blade assembly configurations to be attached to a large variety of wiper arm configurations.

In one aspect, generally, the invention features a windshield wiper blade assembly system that includes a windshield wiper blade assembly and an adapter. The assembly includes a windshield wiper blade connector configured to be connected to a first type of windshield wiper arm, a windshield wiper blade carrier attached to the connector, and a windshield wiper blade attached to the windshield wiper blade carrier. The adapter is configured to be attached to the connector to permit connection of the windshield wiper blade assembly to a second type of windshield wiper arm without detaching the carrier from the connector.

Embodiments of the invention may include one or more of the following features. The connector may be configured to be connected to a hookslot wiper arm having a smaller hook, and the adapter may be configured to permit attachment to a hookslot wiper arm having a larger hook. For example, the adapter may be configured for attachment to 9 mm×4 mm hookslot wiper arms while the connector is configured for attachment to hookslot wiper arms having hooks smaller than 4 mm. The connector also may be configured for attachment to two types of windshield wiper arms, such as hookslot wiper arms and pin-type wiper arms.

The connector may include a movable beam, such as a cantilevered beam, and a tab extending from the movable beam. The tab may be positioned to secure the connector to a hookslot wiper arm by engaging a slot of the hookslot wiper arm when the hookslot wiper arm is attached to the connector. The connector also may include a side wall defining a hole sized to receive a pin of a pin-type wiper arm. The movable beam may be positioned relative to the hole so that the beam secures the connector to a pin-type wiper arm by engaging the pin of the pin-type wiper arm when the pin is received in the hole.

The connector also may include a second side wall that defines a second hole sized to receive the pin of the pin-type wiper arm, and an upper wall that extends between the first and second side walls. The side walls may extend above the upper wall to define a channel along the top of the connector. The channel may secure a portion of a hookslot wiper arm when the connector is attached to the hookslot wiper arm.

The tab may be located on a first side of the movable beam and the movable beam may be positioned so that a second side of the movable beam engages the pin of the pin-type wiper arm when the connector is attached to the pin-type wiper arm. The tab may include a ramped end positioned to encounter an end of the hookslot wiper arm as the connector is attached to the hookslot wiper arm.

The movable beam and the tab may be configured so that the beam may be depressed to bend the beam and retract the tab from the slot of the hookslot wiper arm to release the connector from the hookslot wiper arm. The beam may be bent similarly to release the connector from a pin-type wiper arm. The connector also may include a textured button for use in bending the movable beam.

The movable beam may be positioned relative to the hole in a side wall so that the beam partially blocks a path extending from the hole to the corresponding hole in the opposite side wall. The width of the movable beam may be such that the beam fits within a groove in the pin of the pin-type wiper arm.

The connector may include a snap-fit latch for use in attaching the connector to a windshield wiper blade assembly. In addition to the connector, the assembly may include a windshield wiper blade carrier attached to the connector and a windshield wiper blade attached to the carrier.

When the adapter is configured to permit attachment to a hookslot wiper arm, the adapter may include an upper wall and may be configured to fit atop the upper wall of the connector. To permit attachment to a hookslot wiper arm having a larger hook, the distance between the upper wall of the adapter and the movable beam is greater than a distance between the upper wall of the connector and the movable beam when the adapter is attached to the connector.

The upper wall of the connector may include an opening, and the adapter may include a mechanism configured to fit within the opening to secure the adapter to the connector. For example, the mechanism may be a pair of hooked arms.

When the side walls of the connector extend above the upper wall to define a channel along the top of the connector, the adapter may be configured to fit within the channel of the connector and to define a second channel along the top of the adapter. The second channel secures a portion of a hookslot wiper arm when the connector and adapter are attached to the hookslot wiper arm.

The adapter also may be configured to permit attachment to a straight wiper arm. For this purpose, the adapter may include a first end configured to be attached to a straight wiper arm, and a second end having a hook configured to be attached to the connector. The hook may include a slot positioned to engage the tab of the connector when the adapter is attached to the connector to secure the adapter to the connector.

The first end of the adapter may include a channel configured to receive an end of the straight wiper arm. The channel may include an opening configured to engage a tab positioned near the end of the straight wiper arm. The opening may be formed in an end of a movable beam formed in a wall of the channel.

The invention provides a simple and efficient connector for attaching windshield wiper blades to different types of wiper arms. This promises to dramatically simplify the process of replacing wiper blades, and also will serve to eliminate or reduce waste associated with providing multiple connectors with each blade.

Other features and advantages of the invention will be apparent from the following detailed description, including the drawings, and from the claims.

BRIEF DESCRIPTION OF THE DRAWING

FIGS. 6A–6C are perspective views illustrating attachment of the connector of FIG. 1 to a pin-type wiper arm.

FIGS. 7A–7C are perspective views illustrating attachment of the connector of FIG. 1 to a hookslot wiper arm.

FIGS. 11A–11F are perspective, side, top, bottom, front and rear views of a shim for attachment of a large hookslot wiper arm to the connectors of FIGS. 1 and 10A.

DESCRIPTION OF THE PREFERRED EMBODIMENTS

Figure 1:
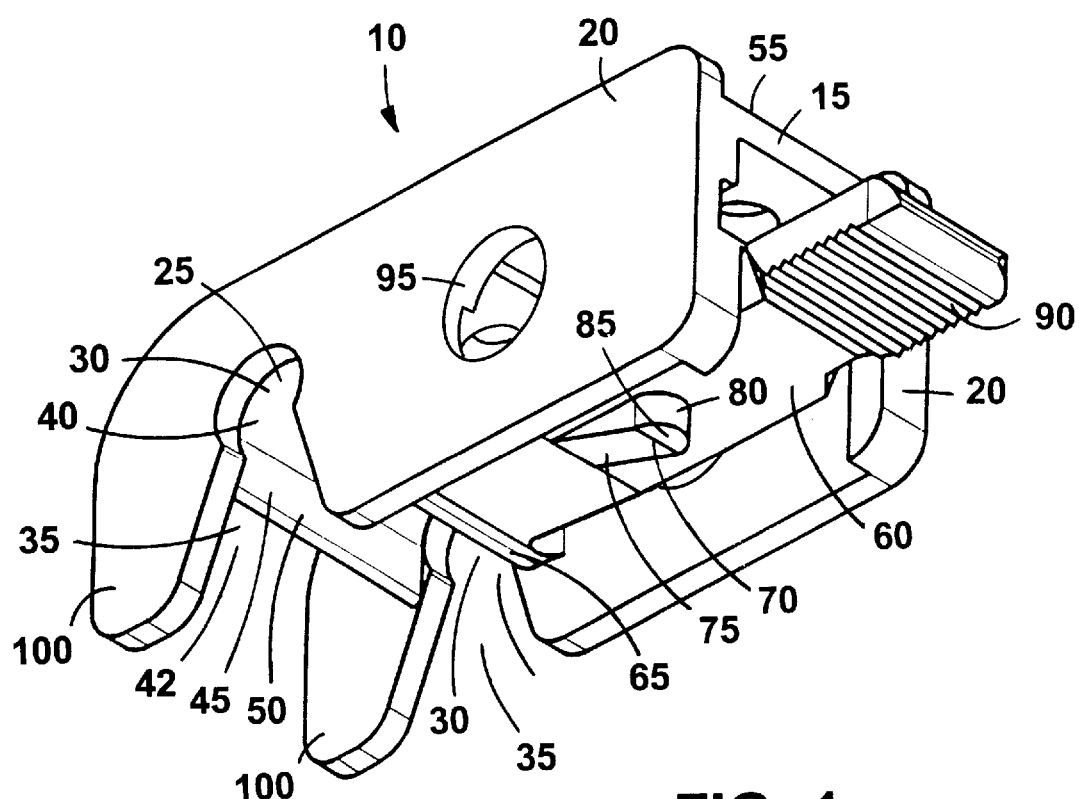
FIG. 1 is a perspective view of a multi-purpose windshield/wiper blade connector.
Figure 2:
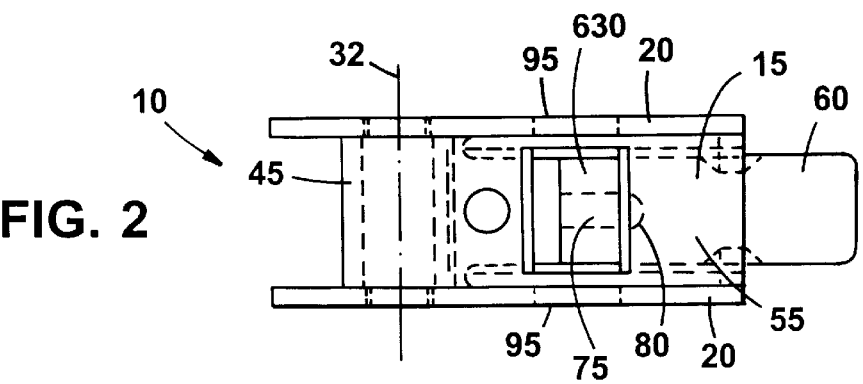
FIGS. 2–5 are top, side, bottom and end views of the connector of FIG. 1.
Figure 5:
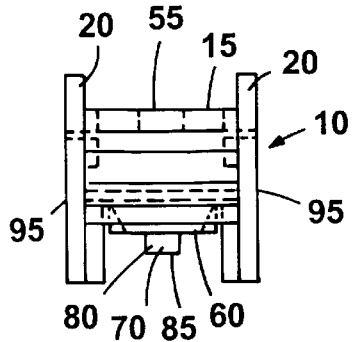
Figure 3:
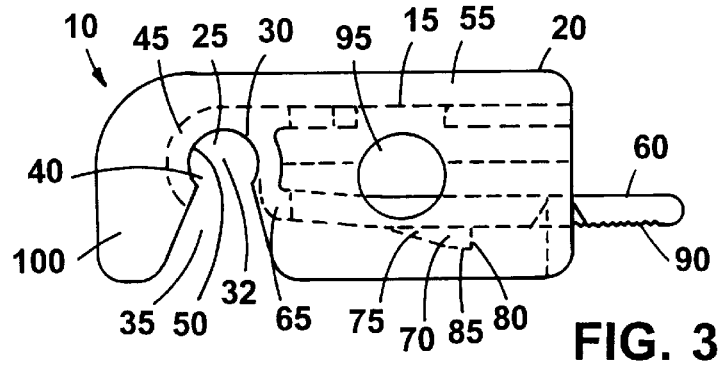
Figure 4:
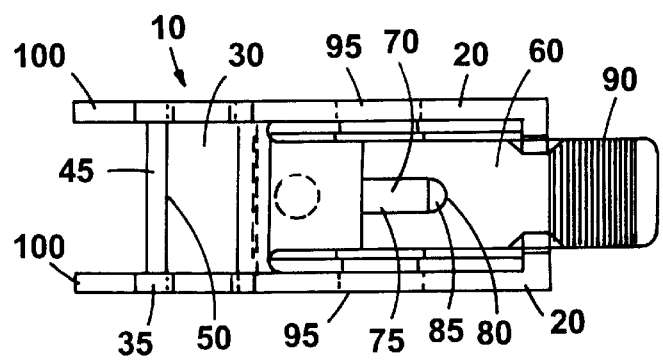

As shown in FIGS. 1–5, a multi-purpose windshield wiper blade connector 10 is configured for attachment to both pin-type and hookslot wiper arms. The connector includes an upper wall 15 and a symmetric pair of side walls 20. At one end of the connector, the upper wall 15 and the side walls 20 define a snap-fit latch 25 for use in attaching the connector 10 to a windshield wiper blade assembly (not shown). The latch is defined by an arcuate channel 30 that includes holes in the side walls, extends between the side walls, and has an axis 32 perpendicular to the side walls. In each side wall 20, a flared opening 35 extends from a narrow region 40 where it joins the arcuate channel 30 to an expanded region 42 at the edge of the side wall. The holes in the side walls, including the narrow region 40, define an arc of greater than 180°. Between the side walls, the channel 30 is relieved relative to the holes in the side walls. This provides for a less stiff connection with the windshield wiper blade assembly. If a more stiff connection were desired, the entire length of the channel 30 could match the shape of the openings in the side walls. In use, the connector 10 is attached to a wiper blade assembly by sliding the flared openings 35 over a rod (not shown) of the wiper blade-assembly so that the openings 35 guide the rod toward the arcuate channel 30. The narrow region 40 of the arcuate channel is sized so that the rod slightly deforms the connector to expand the narrow region 40 as the rod passes through the narrow region. Once the rod passes through the narrow region 40, the connector snaps back so that the narrow region 40 secures the rod within the arcuate channel 30.

The upper wall 15 curves down at the end of the connector at which the latch 25 is located. The curved end 45 of the upper wall 15 defines a first portion 50 of the arcuate channel 30. The side walls 20 extend slightly above the upper wall 15 to define a channel 55 along the top of the connector 10. As discussed below, the channel 55 secures a portion of a hookslot wiper arm when a windshield wiper blade assembly including the connector 10 is secured to a hookslot wiper arm.

A cantilevered beam 60 extends from a second portion 65 of the arcuate channel 30. The beam 60, which is not directly attached to the side walls 20, is positioned near the bottom of the connector 10 and is aligned with the upper wall 15. The beam 60 is used to secure the connector 10 to both hookslot and pin-type wiper arms. To this end, the beam 60 includes a tab 70 that is used to secure the connector to a hookslot wiper arm. The tab 70 includes a ramped face 75 at an end of the tab closer to the latch 25, a stepped end 80 at the other end of the tab, and a flat portion 85 between the two ends. The beam 60 also includes a textured button 90 that may be depressed to bend the beam 60 and retract the tab 70 to release the connector 10 from the hookslot wiper arm.

For attachment to a pin-type wiper arm, each side wall 20 of the connector includes a circular hole 95 that permits insertion of the pin into the connector. The holes 95 are positioned relative to the beam 60 so that the beam partially blocks a path between the holes 95 near the bottoms of the holes. The width (W) of the beam 60 is such that the beam fits within a groove in the pin.

As shown in FIGS. 6A–6C, the connector 10 (or a windshield wiper blade assembly including the connector 10) may be attached to a pin-type wiper arm 200. The wiper arm 200 includes a pin 205 having a rounded end 210 and a groove 215. To attach the connector to the arm 200, the pin 205 is aligned with the holes 95 and inserted into a hole 95 (FIG. 6A). As the pin 205 is inserted into the hole 95, the rounded end 210 of the pin encounters the beam 60 and pushes down on the beam 60 (FIG. 6B). The downward force exerted by the pin 205 bends the beam 60 and permits further insertion of the pin into the hole 85. When the pin 205 is inserted far enough that the pin extends through the other hole 95, the beam 60 aligns with the groove 215. This removes the force that was previously asserted by the pin against the beam 60 and permits the beam 60 to snap into place within the groove 215 (FIG. 6C). Interference between sides of the beam 60 and sides of the groove 215 secures the connector 10 against lateral motion along the pin 205 while permitting pivotal motion about the pin 205.

The connector 10 may be removed from the arm 200 in a two-step process. A user first pulls down on the beam 60 to release the beam from the groove 215. The user then slides the connector 10 off of the pin 205.

As shown in FIGS. 7A–7C, the connector 10 also may be attached to a hookslot wiper arm 300. An end 305 of the wiper arm 300 is bent to define a hook 310. A slot 315 is located in the hook 310 near the end 305. To attach the connector to the arm 300, the connector is positioned with the channel 55 next to a main portion 320 of the arm 300 and the end of the connector having the latch 25 facing the hook 310 (FIG. 7A). The connector is then moved along the arm 300 so that the curved end 45 of the upper wall passes between the hook 310 and the main portion 320 of the arm 300, and the end 305 of the arm 300 passes between extensions 100 of the connector.

When the end 305 of the arm 300 encounters the tab 70, the hook slides along the ramped end 75 in a horizontal direction. This generates an upward force that pushes up on the beam 60 and bends the beam (FIG. 7B). The hook continues to exert the upward force on the beam until the stepped end 80 of the tab is aligned with the slot 315. At that point, the beam 60 snaps back into place and forces the tab 70 into the slot 315 (FIG. 7C). When the tab is in the slot, the stepped end 80 of the tab abuts against an inner wall of the slot to hold the connector 10 in place on the hookslot arm 300.

The connector 10 may be removed from the arm 300 in a two-step process. A user first depresses the button 90 to push up on the beam 60 to release the tab 70 from the slot 315. The user then slides the connector 10 from between the hook 310 and the main portion 320.

Figure 8A:
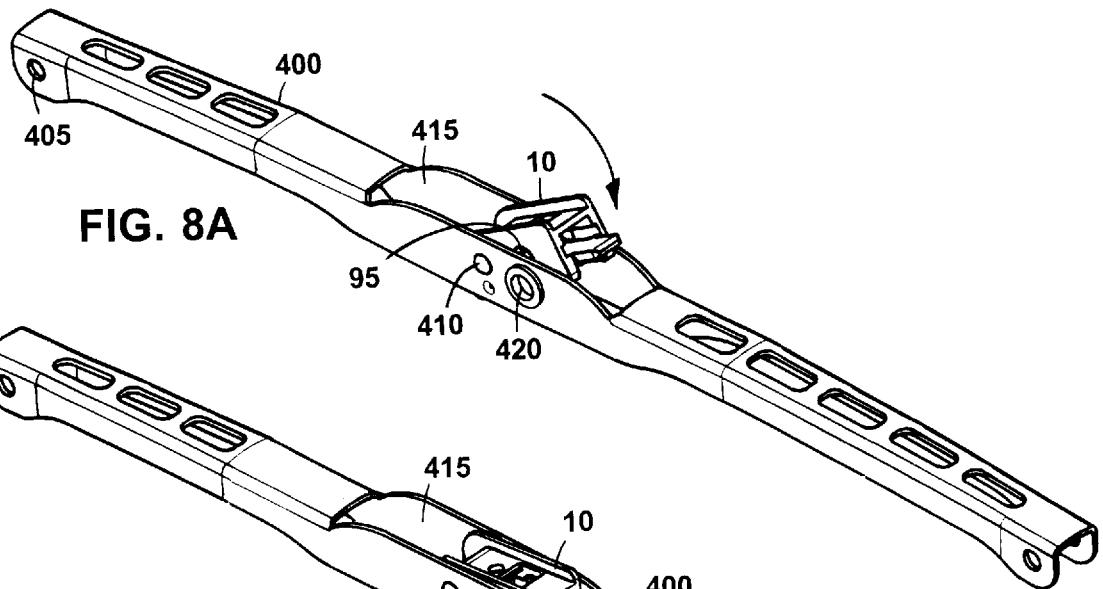
FIGS. 8A–8C are perspective views illustrating attachment of a wiper blade assembly including the connector of FIG. 1 to a pin-type wiper arm.
Figure 8B:
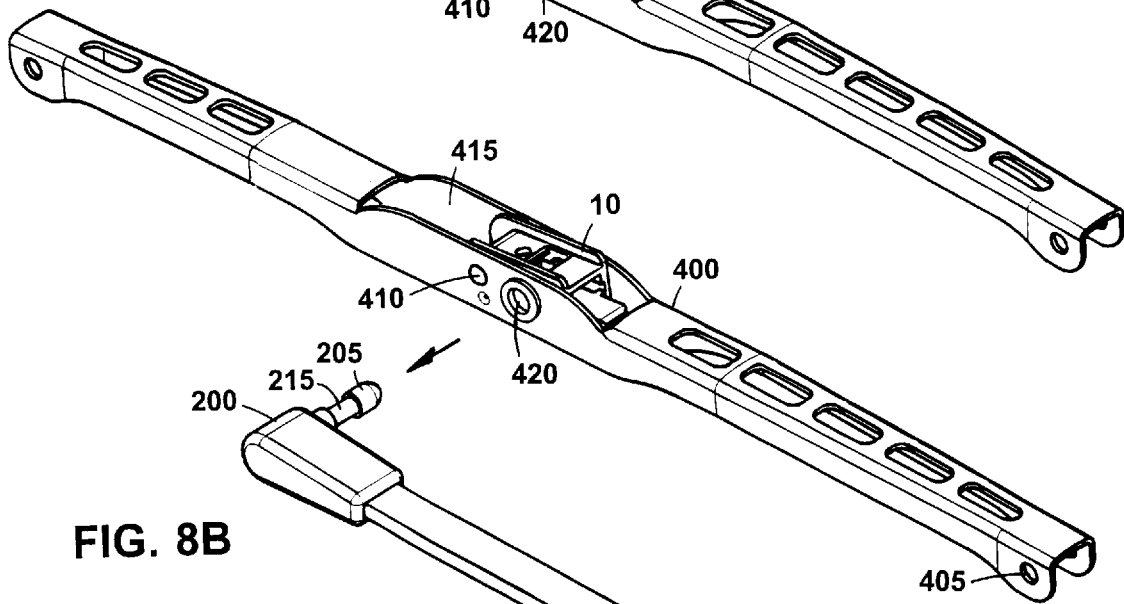
Figure 8C:
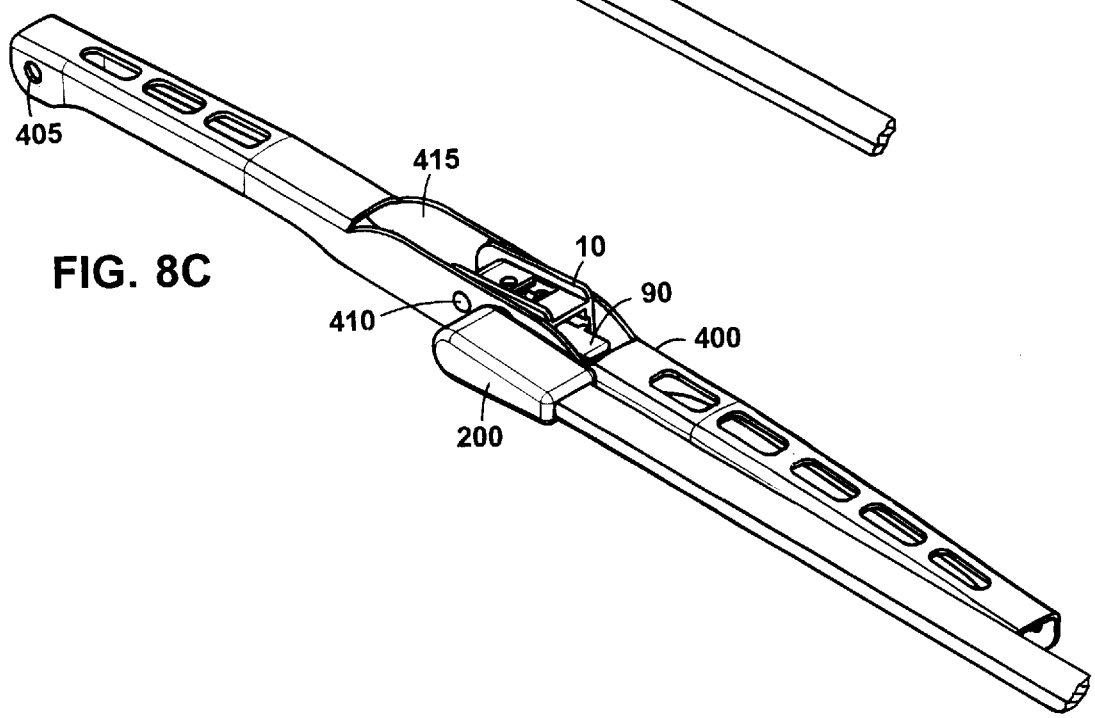

As illustrated in FIGS. 8A–8C, a wiper blade carrier 400 includes a connector 10 and attachment holes 405 to which a windshield wiper blade may be attached. The carrier 400 may be installed on a pin-type arm 200 using a simple procedure. First, the connector 10 is rotated about a rod 410 within a bridge opening 415 of the carrier 400 until the holes 95 in the sides of the connector are aligned with bridge side holes 420 in the sides of the carrier 400 (FIG. 8A). Next, a bridge side hole is pushed onto the pin 205 of the wiper arm (FIG. 8B) until the beam 60 snaps into place in the groove 215 of the pin 205 (FIG. 8C).

Referring to FIG. 8C, the upper surface of the button 90 is exposed by the bridge opening 415 when the carrier 400 is attached to the wiper arm 200. Accordingly, the carrier 400 may be removed from the arm 200 by pushing down on the upper surface of the button 90 and sliding the carrier 400 off of the pin 205.

Figure 9A:
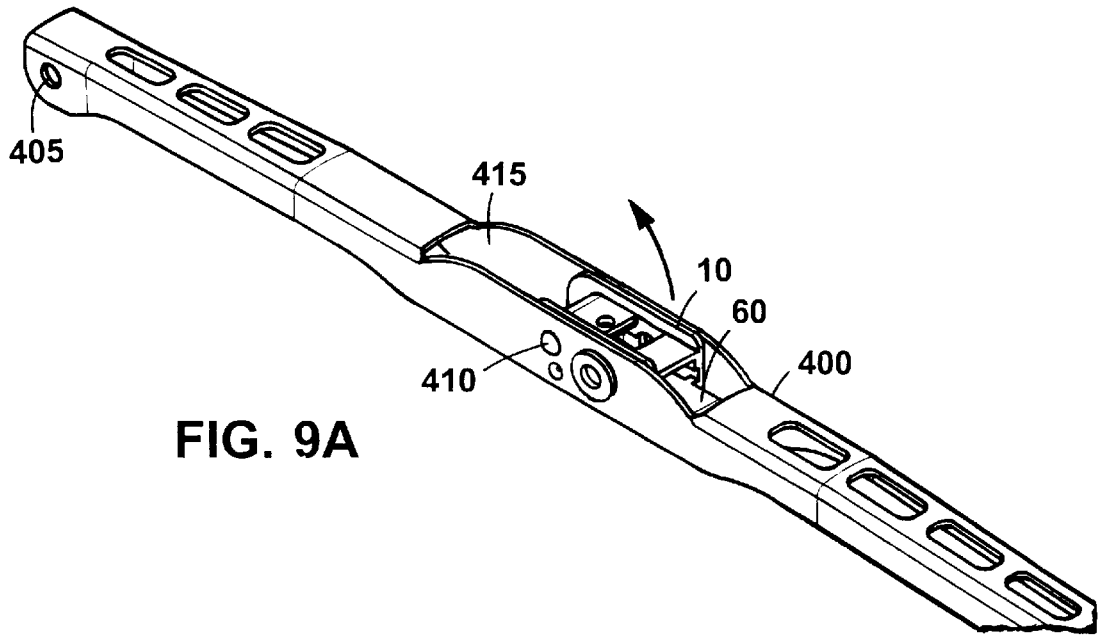
FIGS. 9A–9D are perspective views illustrating attachment of a wiper blade assembly including the connector of FIG. 1 to a hookslot wiper arm.
Figure 9B:
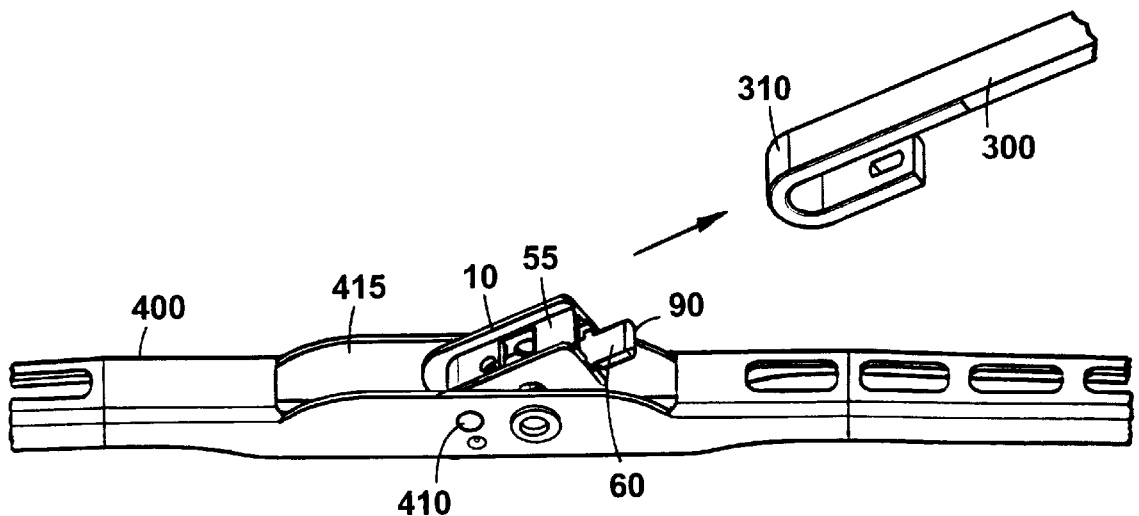
Figure 9C:
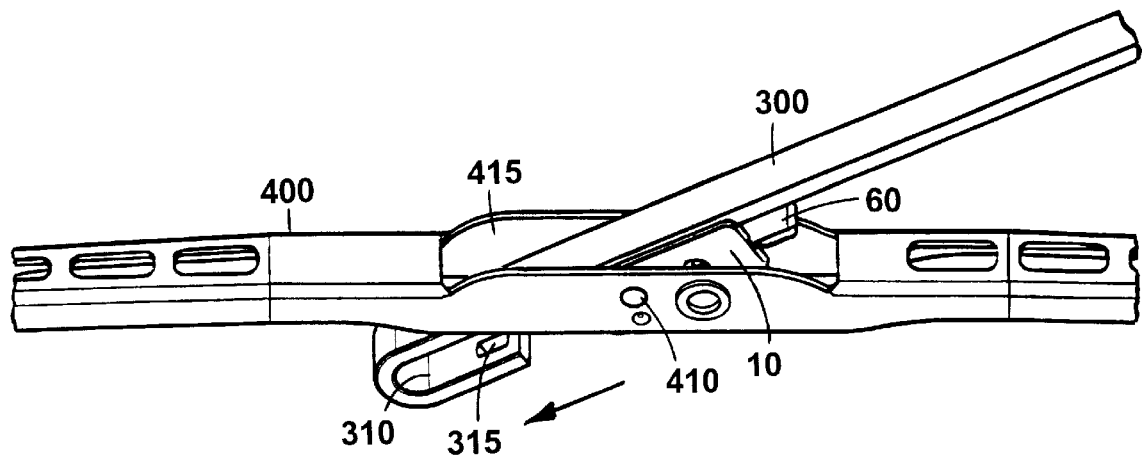
Figure 9D:
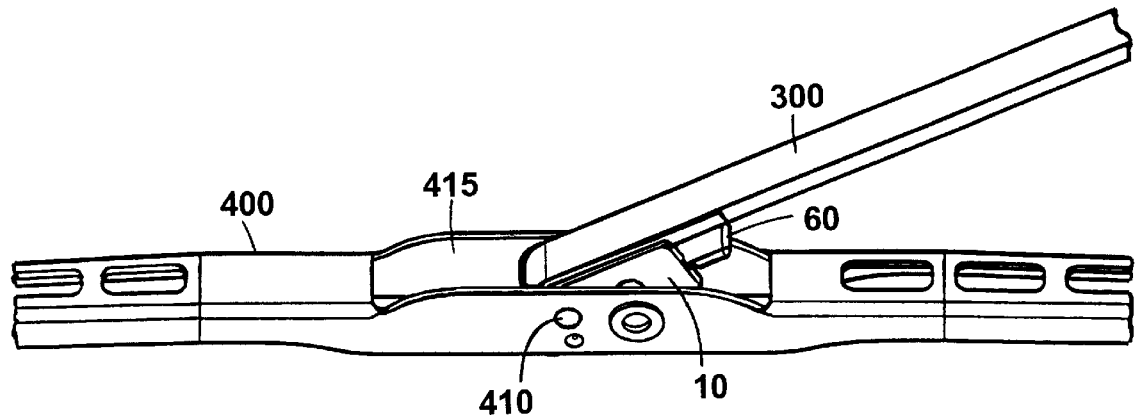

As illustrated in FIGS. 9A–9D, the wiper blade carrier 400 also may be installed on a hookslot wiper arm 300 using a simple procedure. First, the connector 10 is rotated about the rod 410 (FIG. 9A) until the beam 60 extends from the bridge opening 415 to provide clearance (FIG. 9B). Next, the carrier 400 is moved past the hook end 310 of the hookslot wiper arm 300 (FIG. 9B) until the hook 310 extends through the bridge opening 415 and the wiper arm rests in the channel 55 at the top of the connector (FIG. 9C). Finally, the carrier 400 is moved back toward the hook 310 (FIG. 9C) until the connector 10 snaps onto the wiper arm 300 (FIG. 9D). The carrier 400 may be removed from the arm 300 by pressing up on the button 90 to release the tab 70 from the slot 315. With the button pressed, the steps of the installation procedure are reversed to remove the carrier 400 from the arm 300.

FIGS. 10A–10E illustrate another connector 500. The connector 500 differs from the connector 10 only in that holes 505 of the connector 500 are larger than the corresponding holes 95 of the connector 10. The connector 500 is sized for use with pin-type arms having ¼ inch diameter pins. By contrast, the connector 10 is sized for use with pin-type arms having 3/16 inch diameter pins. Both connectors also are sized and configured for use with 9 mm wide hookslot arms having thicknesses of 2.5 mm, 2.8 mm, 3.0 mm, 3.2 mm or 3.5 mm.

Figure 10A:
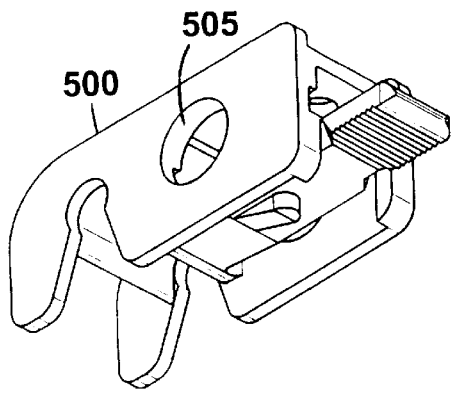
FIGS. 10A–10E are perspective, top, side, bottom and end views of another multi-purpose windshield wiper blade connector.
Figure 10B:
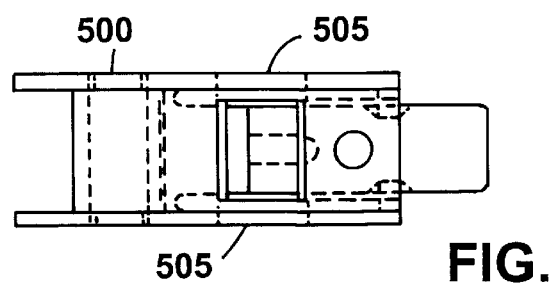
Figure 10C:
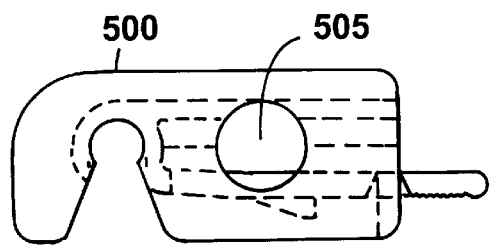
Figure 10E:
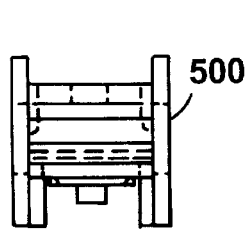
Figure 10D:
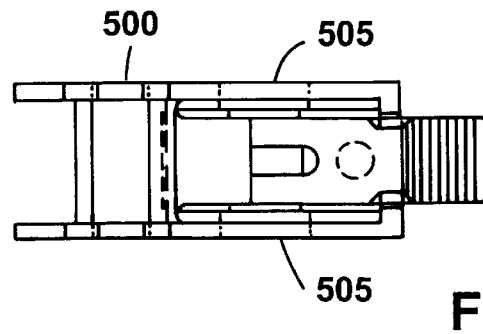
Figure 11A:
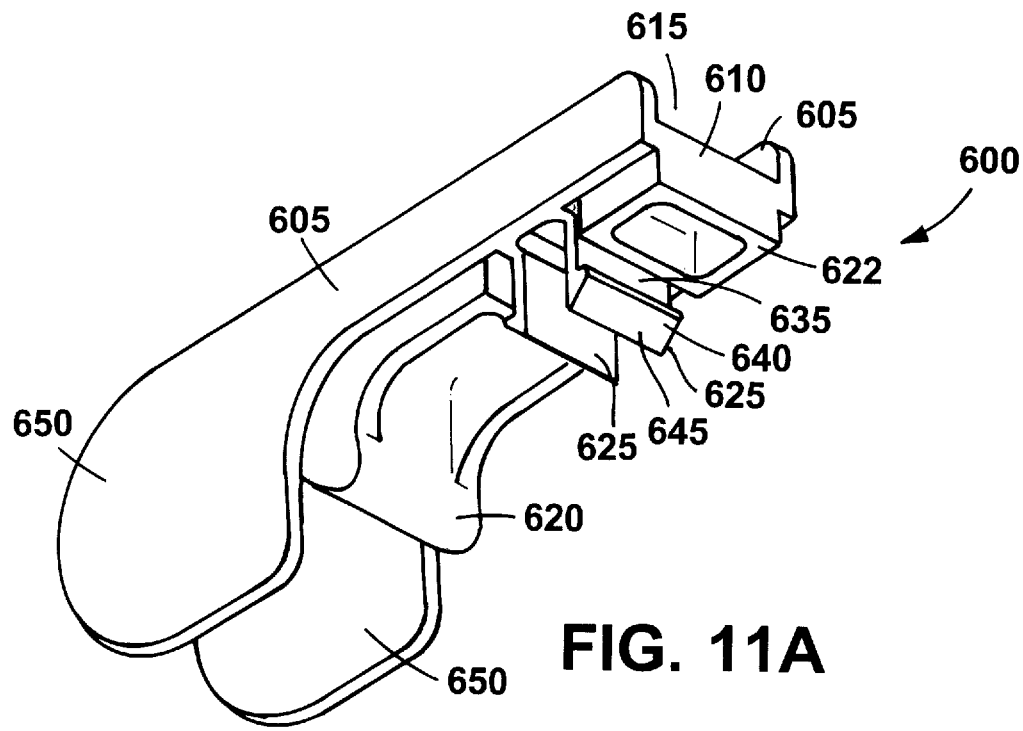
Figure 11B:
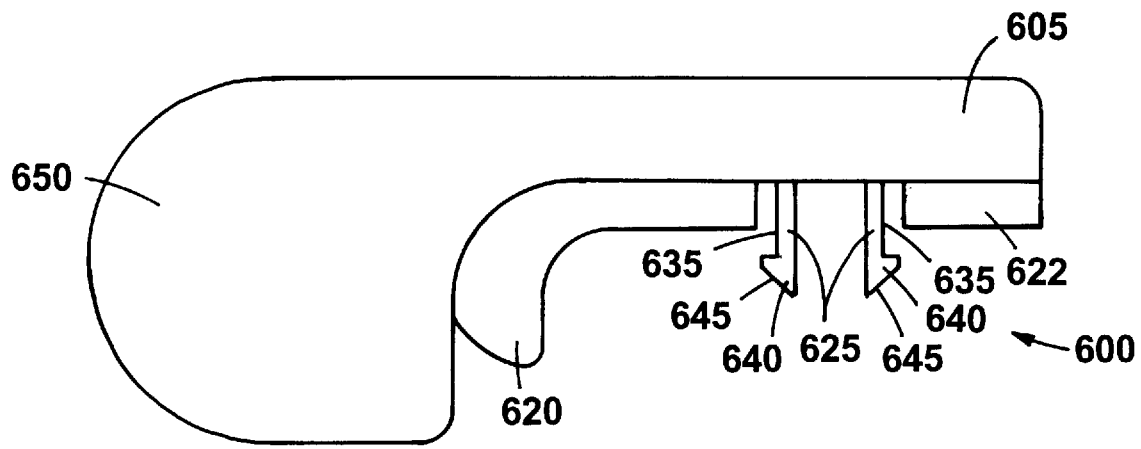

FIGS. 11A–11F illustrate a shim 600 that may be used to adapt the connector 10 of FIG. 1 or the connector 500 of FIG. 10A for use with hookslot arms having a width of 9 mm and a thickness of 4 mm. The ISO Standard 9 mm×4 mm wiper arm configuration was introduced to the United States automotive market in 1992, and has become quite popular. This has resulted in a growing market for wiper blade assemblies configured to fit this wiper arm configuration.

The shim 600 includes a symmetric pair of side walls 605 that are spaced by an amount (e.g., 10 mm) equal to the spacing between the side walls 20 of the connector 10 (FIG. 1). An upper wall 610 extends between the two side walls 605. The side walls 605 extend slightly above the upper wall 610 to define a channel 615 along the top of the shim 600. As discussed below, the channel 615 secures the 9 mm×4 mm hookslot arm.

Extensions 620, 622 at the bottom of the shim 600 are sized to fit snugly within the channel 55 of the connector 10. The extension 620 is shaped to conform to the curvature of the upper wall 15 of the connector 10. The extensions 620, 622 align the shim 600 with the connector 10 and help to secure the shim to the connector 10.

A pair of hooked arms 625 fit within an opening 630 (FIG. 2) in the connector 10 to secure the shim 600 to the connector 10. The arms are spaced so that a distance between outer surfaces 635 of the arms corresponds to the width of the opening 630. Hooks 640 extend beyond the width of the opening 630 to secure the arms within the opening. The hooks 640 include ramped portions 645 that ease insertion of the arms into the opening.

The side walls 605 include increased-height portions 650 that extend beyond the upper wall 610. These portions permit the shim 600 to be used with hookslot arms having hooks of different lengths. In particular, the portions 650 prevent side-to-side motion of hooks that extend beyond the upper wall 610 and the channel 615.

Figure 12:
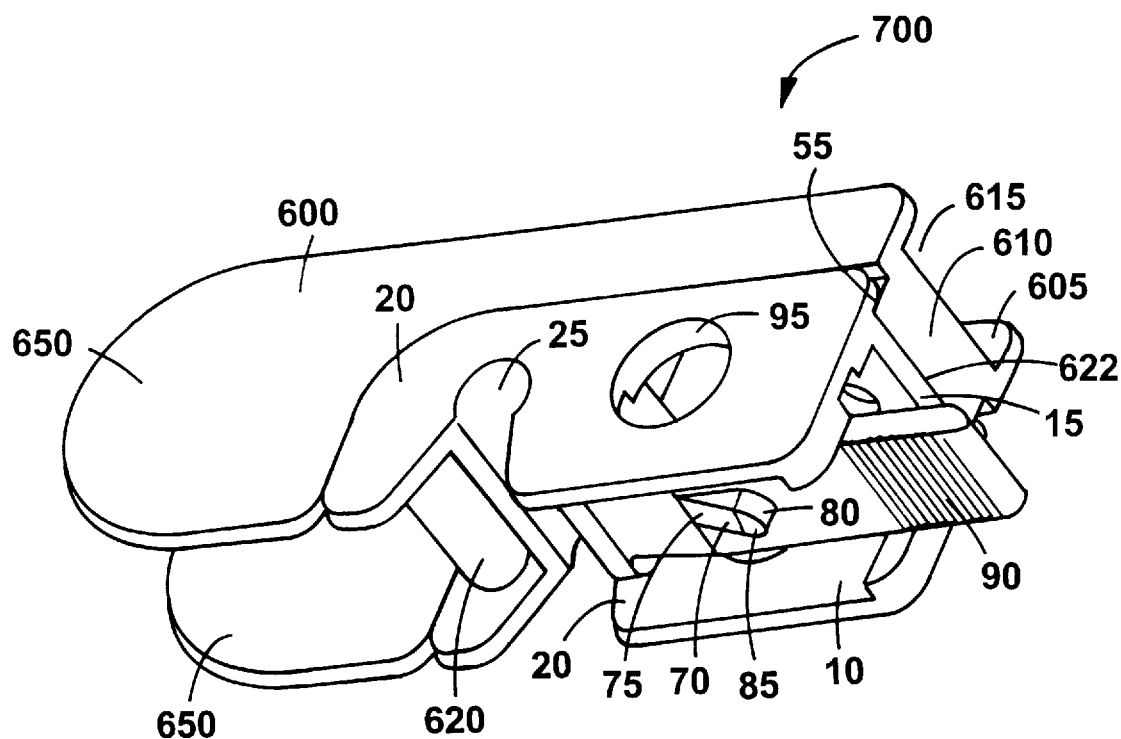
FIG. 12 is a perspective view showing the shim of FIG. 11A attached to the connector of FIG. 1.

As shown in FIG. 12, the shim 600 may be attached to the connector 10 to form an integral unit 700 for use in attaching a wiper blade assembly to a 9 mm×4 mm hookslot arm. As noted above, the shim is secured to the connector by the interaction between the hooked arms 625 and the opening 630. The side walls 605 of the shim are aligned with the side walls 20 of the connector, and the extensions 620, 622 are positioned within the channel 55 of the connector. This serves to prevent movement of the shim relative to the connector and further secures the shim to the connector.

Figure 13A:
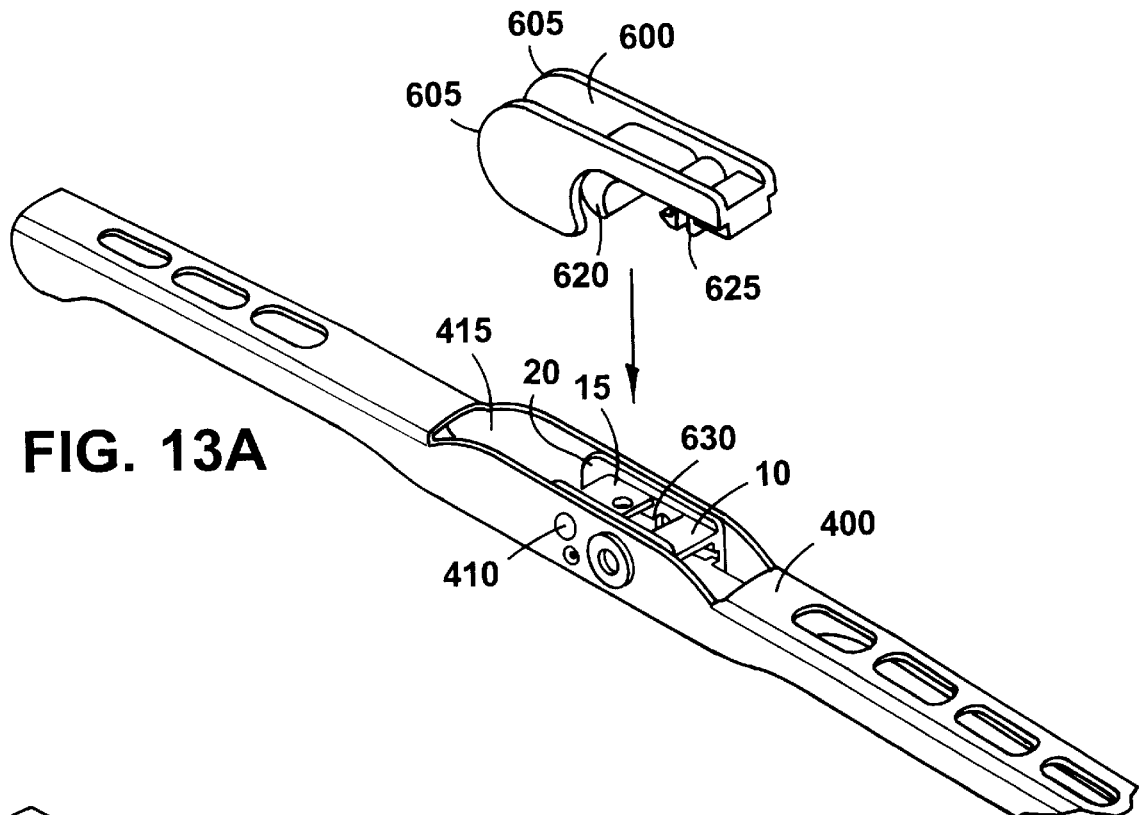
FIGS. 13A–13F are perspective views illustrating attachment of a wiper blade assembly including the connector of FIG. 1 to a large hookslot wiper arm.
Figure 13B:
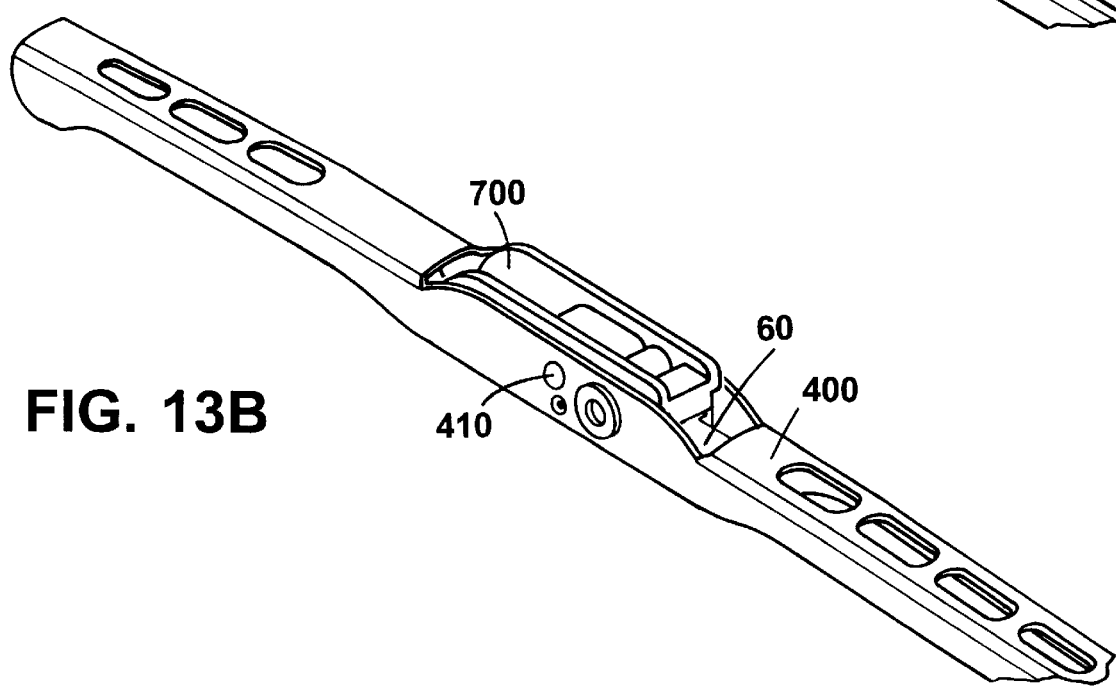

As illustrated in FIGS. 13A–13F, the shim 600 may be used to install the wiper blade carrier 400 on a 9 mm×4 mm hookslot wiper arm 800 through a simple procedure. First, the shim 600 is attached to the connector 10 (FIG. 13A). With the extension 620 aligned with the curved portion of the upper wall 15, the side walls 605 aligned with the side walls 20, and the hooked arms 625 aligned with the opening 630, the shim 600 is pushed down onto the connector until the hooked arms 625 snap into place within the opening 630 (FIG. 13B).

Figure 13C:
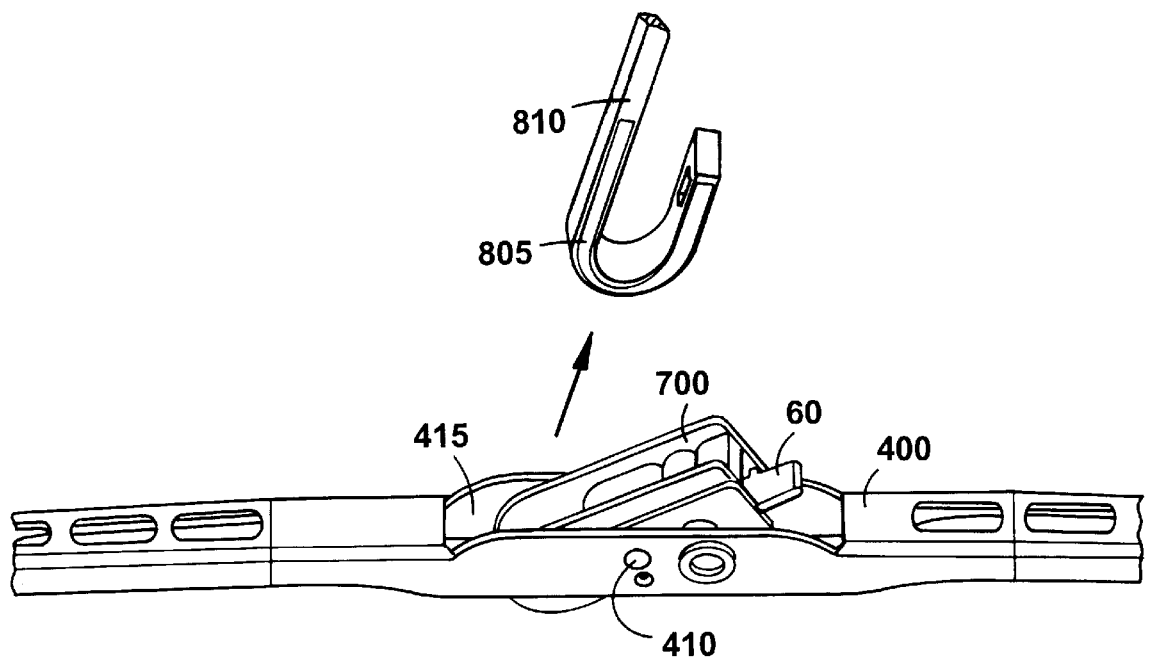
Figure 13D:
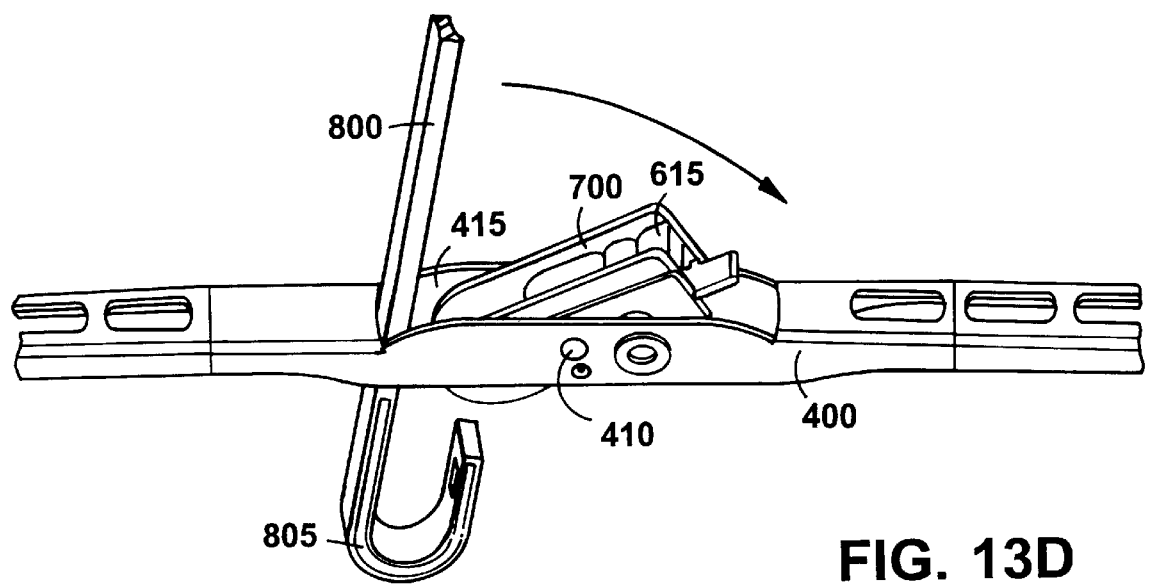
Figure 13E:
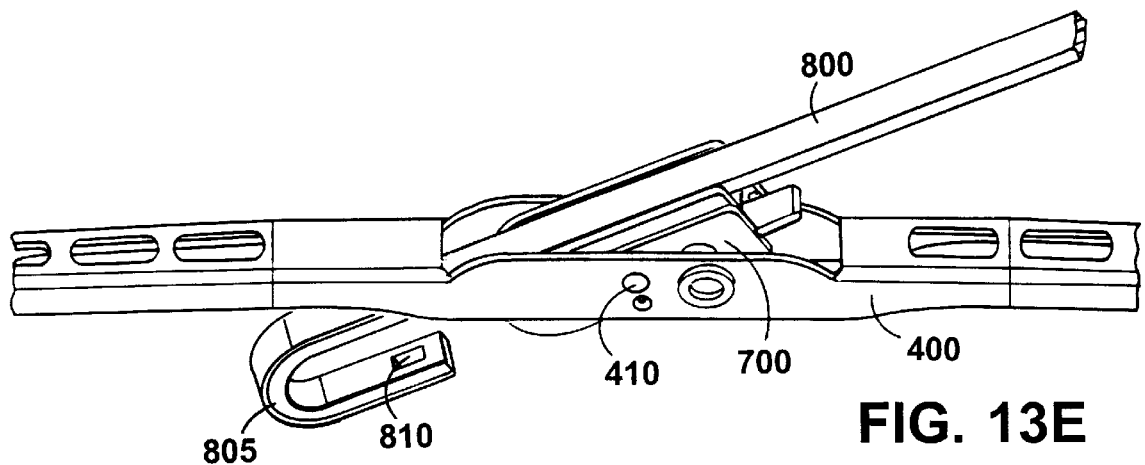
Figure 13F:
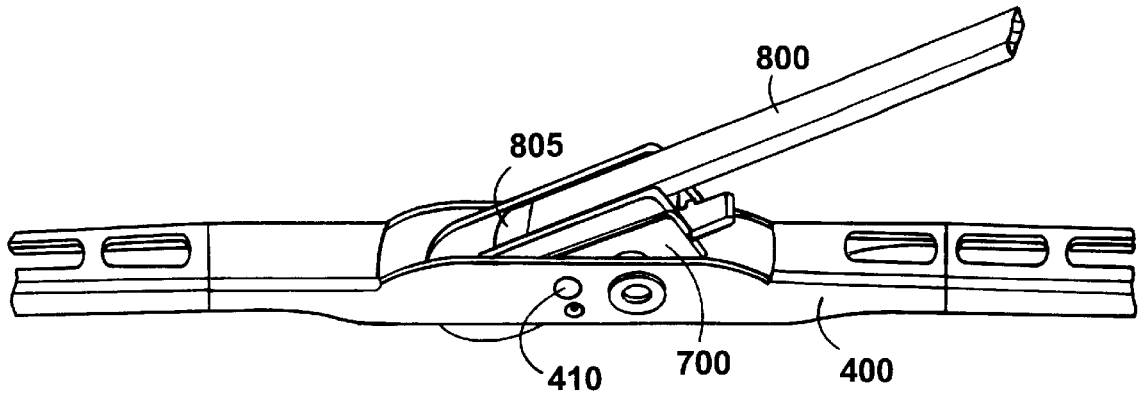
Figure 14A:
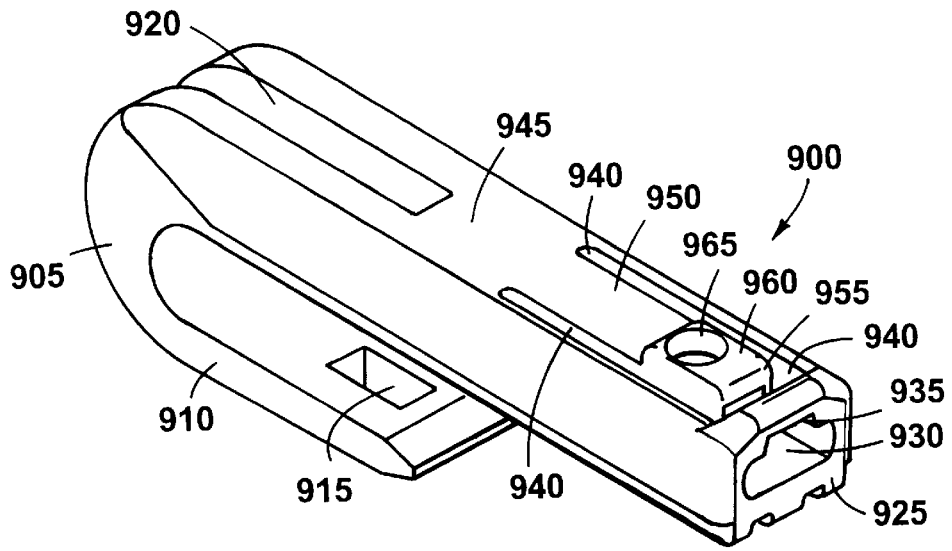
FIGS. 14A–14F are perspective, side, top, bottom, front and rear views of a straight arm adapter for attachment of a straight wiper arm to the connectors of FIGS. 1 and 10A.
Figure 14B:
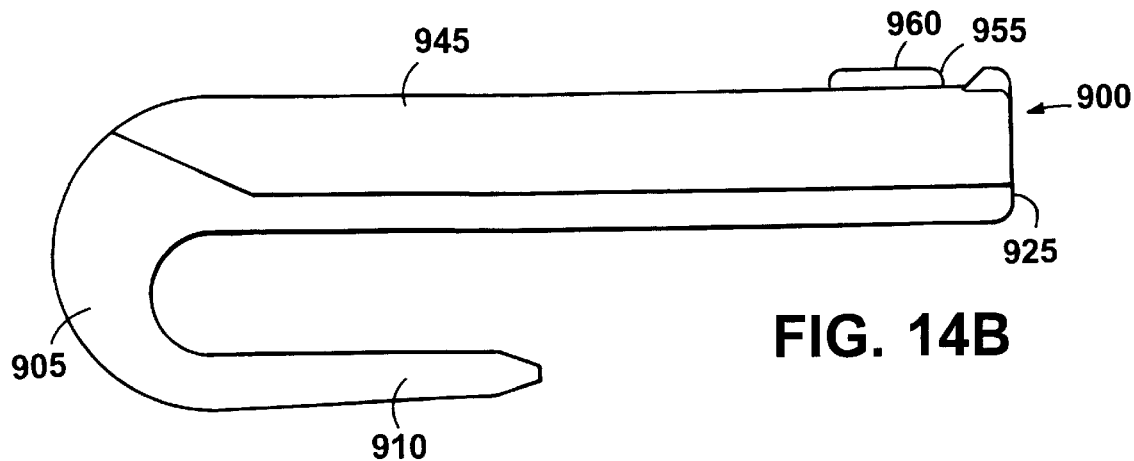
Figure 14E:
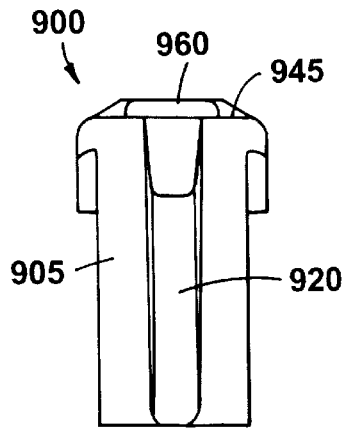
Figure 14F:
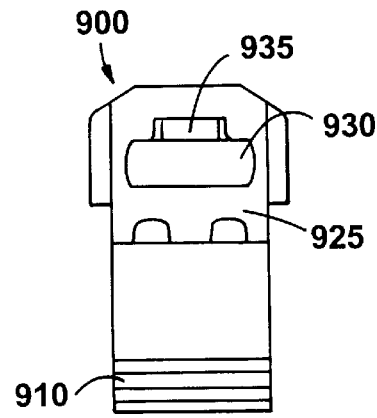
Figure 14C:
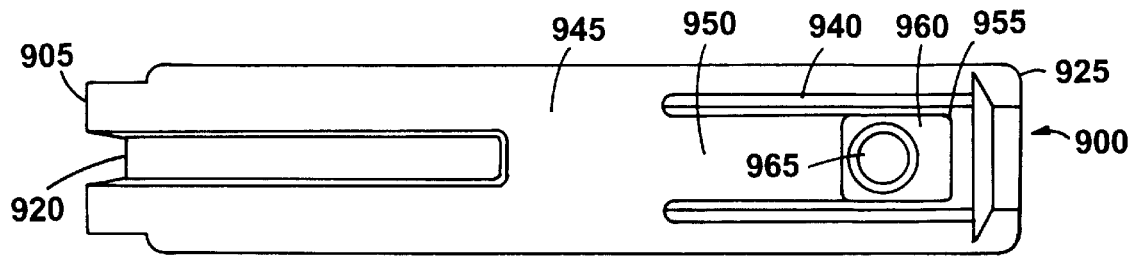
Figure 14D:
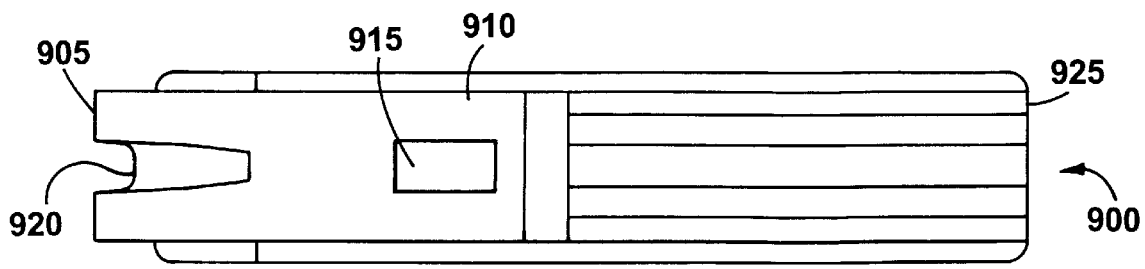

Next, the integral unit 700 formed from the connector 10 and the shim 600 is rotated about the rod 410 (FIG. 13B) until the beam 60 extends from the bridge opening 415 to provide clearance (FIG. 13C). Next, the carrier 400 is moved past the hook end 805 of the hookslot wiper arm 800 (FIG. 13C) until the hook 805 extends through the bridge opening 415 (FIG. 13D). The carrier is then rotated relative to the wiper arm 800 (FIG. 13D) until the wiper arm rests in the channel 615 at the top of the unit 700 (FIG. 13E). Finally, the carrier 400 is moved back toward the hook 805 (FIG. 13E) until the unit 700 snaps onto the wiper arm 800 through interaction of the tab 70 with the slot 810 in the wiper arm (FIG. 13F). The carrier 400 may be removed from the arm 800 by pressing up on the button 90 to release the tab 70 from the slot 810. With the button pressed, the steps of the installation procedure are reversed to remove the carrier 400 from the arm 800.

FIGS. 14A–14F illustrate an adapter 900 that may be used to attach the connector 10 of FIG. 1 or the connector 500 of FIG. 10A to a straight wiper arm. The adapter includes a hooked end 905 that mimics the end of a hookslot wiper arm and is configured to be secured to the connector 10. For this purpose, the hooked end 905 includes a hook 910 that is sized and shaped to conform to the connector 10 and a slot 915 that is sized and positioned to receive the tab 70 of the connector 10 to secure the adapter to the connector. A groove 920 in the hooked end 905 provides improved resiliency and eases attachment of the adapter to the connector.

The end 925 of the adapter 900 opposite the hooked end 905 includes a channel 930 sized to receive the end of the straight wiper arm. The channel 930 includes an upper groove 935 that is sized to permit passage of a cylindrical tab located near the end of the straight wiper arm. The groove 935 extends from the end 925 of the adapter to a cutout 940 in the upper wall 945 of the adapter.

The cutout 940 defines a beam 950. The free end 955 of the beam 950 includes a pad 960 having increased thickness and a circular opening 965 that is sized to receive the tab of the straight wiper arm. The beam 950 is sufficiently resilient to permit vertical movement of the pad 960 in response to the tab of the straight arm. Accordingly, insertion of the end of the straight arm into the channel causes the tab of the straight arm to bend the beam upward as the tab moves past the end of the beam. When the tab is aligned with the opening, the beam snaps back into place to secure the tab in the opening and thereby secure the adapter to the wiper arm.

Figure 15A:
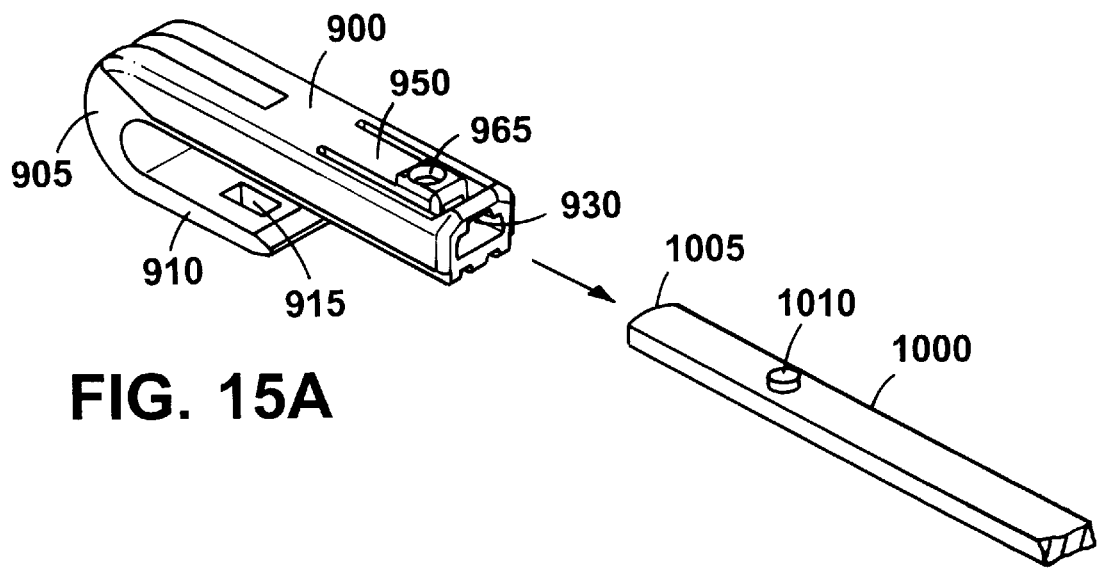
FIGS. 15A–15F are perspective views illustrating attachment of a wiper blade assembly including the connector of FIG. 1 a straight wiper arm.
Figure 15B:
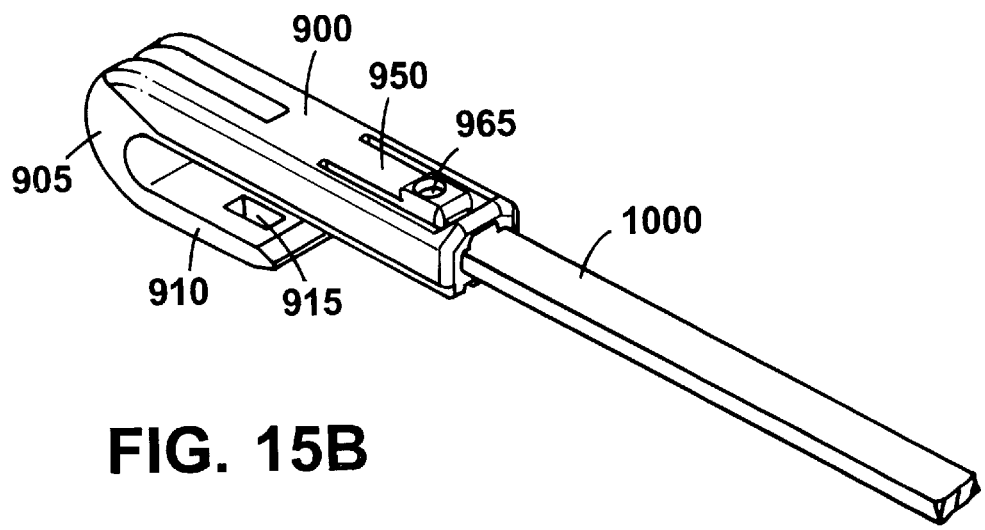
Figure 15C:
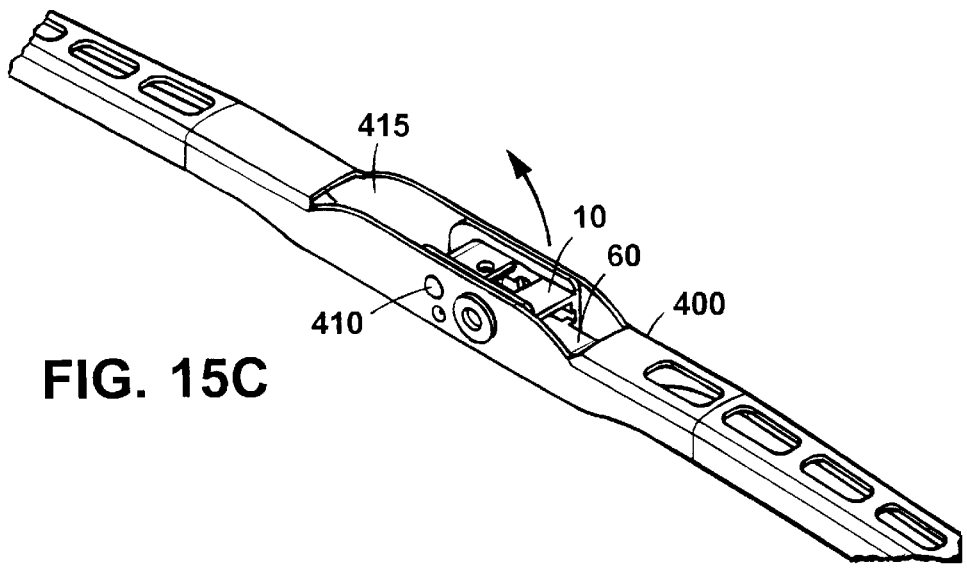

As illustrated in FIGS. 15A–15F, the adapter 900 may be used to install the wiper blade carrier 400 on a straight wiper arm 1000 through a simple procedure. First, the adapter 900 is attached to the end 1005 of the straight wiper arm 1000 (FIGS. 15A and 15B). With the channel 930 aligned with the end 1005 (FIG. 15A), the adapter is pushed on to the end of the wiper arm until the tab 1010 aligns with the opening 965 and the beam 950 snaps into place (FIG. 15B).

Figure 15D:
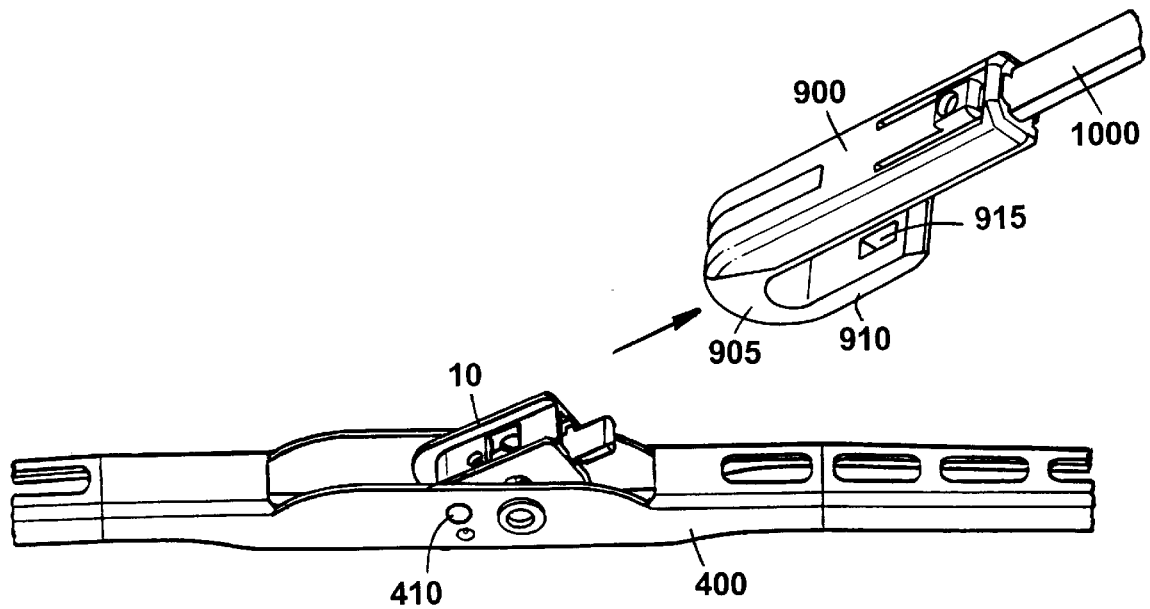
Figure 15E:
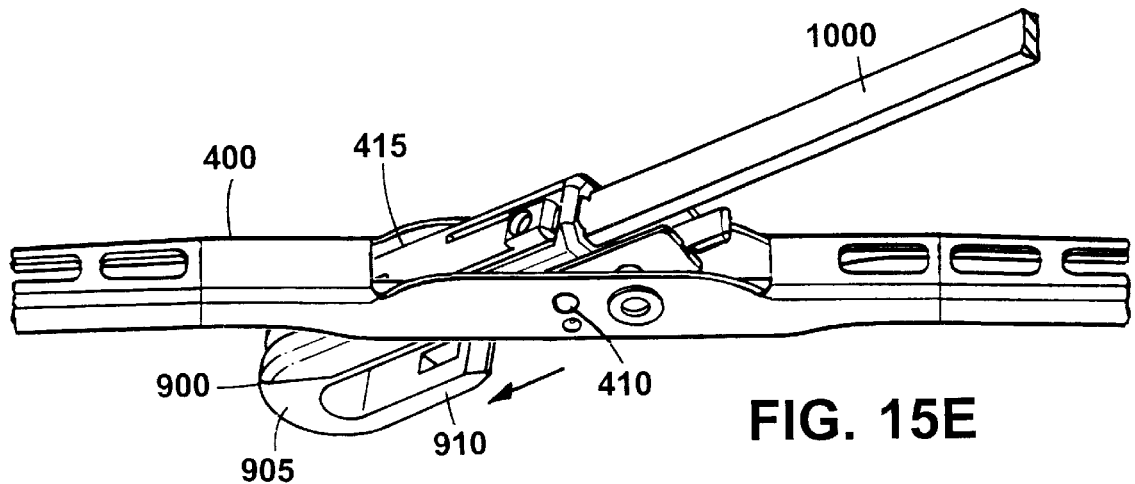
Figure 15F:
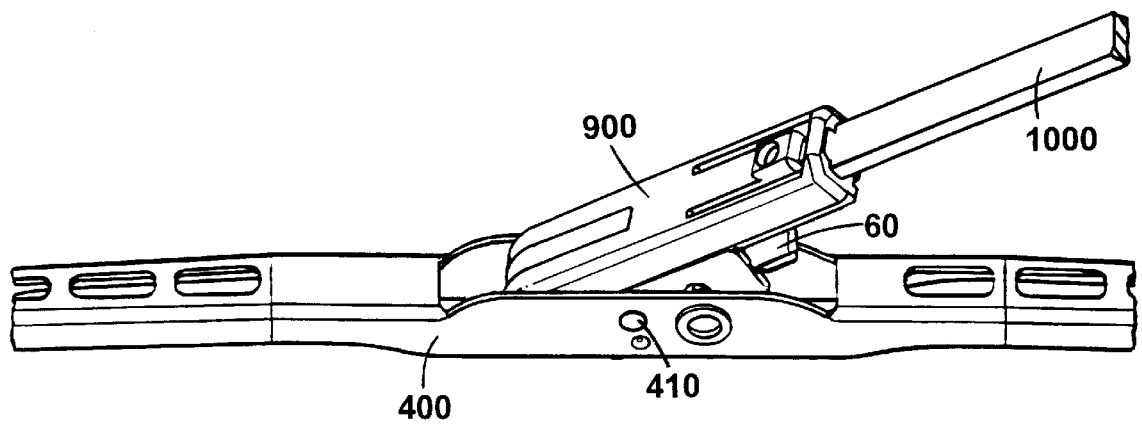

Next, the connector 10 is rotated about the rod 410 (FIG. 15C) until the beam 60 extends from the bridge opening 415 to provide clearance (FIG. 15D). The carrier 400 then is moved past the hook end 905 of the adapter 900 (FIG. 15D) until the hook 910 extends through the bridge opening 415 and the wiper arm 1000 rests in the channel 55 at the top of the connector (FIG. 15E). Finally, the carrier 400 is moved back toward the hook 910 (FIG. 15E) until the connector 10 snaps onto the adapter 900 (FIG. 15F). The carrier 400 may be removed from the arm 1000 by pressing up on the button 90 to release the tab 70 from the slot 915. With the button pressed, the steps of the installation procedure are reversed to remove the carrier 400 from the arm 1000.

Figure 16:
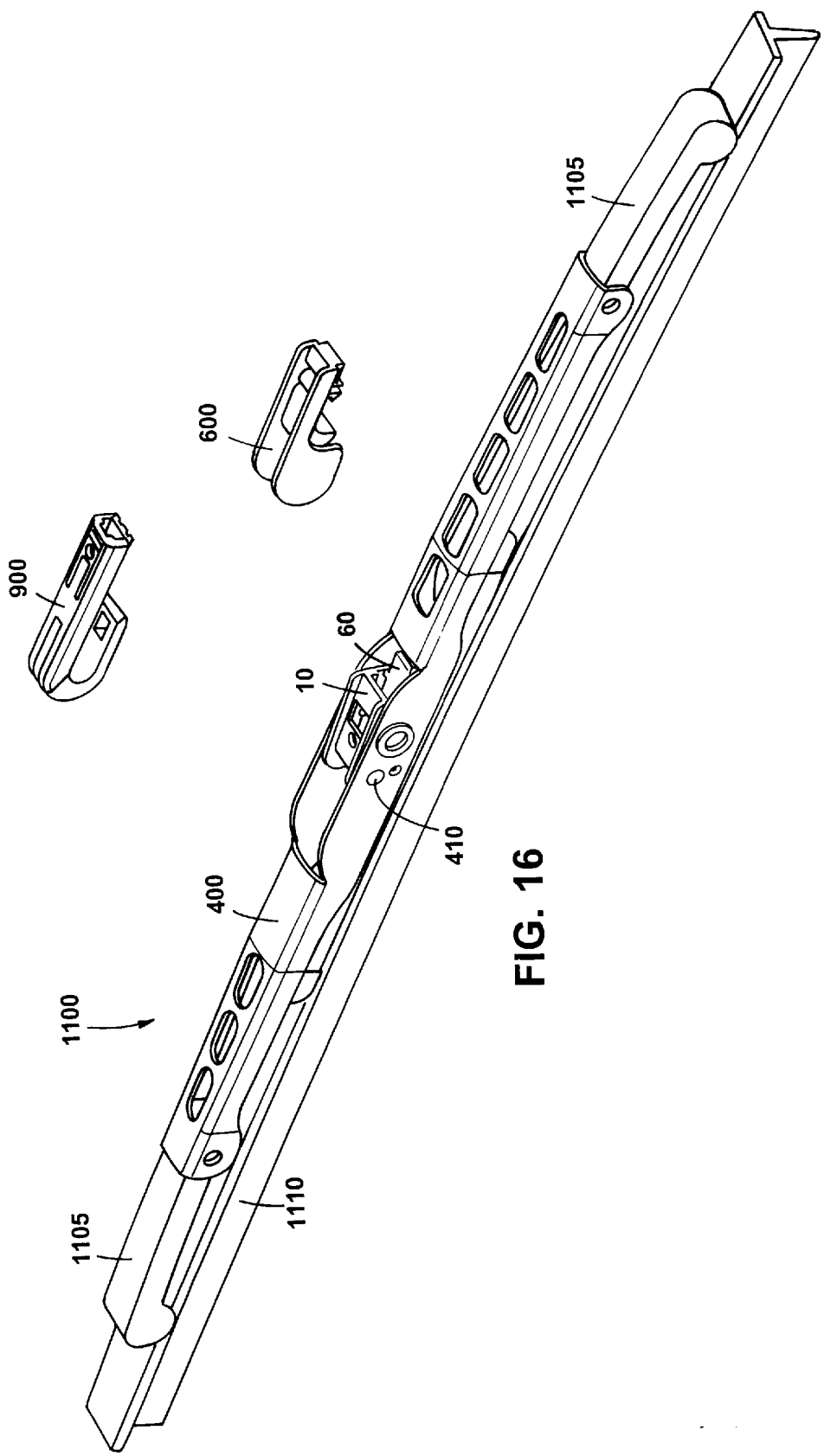
FIG. 16 is a perspective view of a windshield wiper assembly and associated components.

FIG. 16 illustrates a wiper blade assembly 1100 that includes the carrier 400 and the connector 10. Extensions 1105 secure the carrier 400 to a wiper blade 1110. As shown, a shim 600 and an adapter 900 may be packaged with the assembly 1100. This configuration permits the wiper blade assembly 1100 to be used with pin-type wiper arms, hookslot wiper arms (including 9 mm×4 mm hookslot wiper arms) and straight wiper arms. The wiper blade assembly may be attached to all of these types of wiper arms without removing the connector 10 from the wiper blade assembly.

Other embodiments are within the scope of the following claims.

What is claimed is:

1. A windshield wiper blade assembly system for attachment to different types of windshield wiper arms, comprising:

a windshield wiper blade assembly including:
   a windshield wiper blade connector configured to be connected to a first type of windshield wiper arm,
   a windshield wiper blade carrier attached to the connector, and
   a windshield wiper blade attached to the windshield wiper blade carrier; and
an adapter comprising a piece physically separate from the connector and directly attached to the connector to permit connection of the windshield wiper blade assembly to a second type of windshield wiper arm without detaching the carrier from the connector.

2. The system of claim 1, wherein the connector is configured to be connected to the first type of windshield wiper arm and to a third type of windshield wiper arm.

3. The system of claim 2, wherein the first type of windshield wiper arm comprises a hookslot wiper arm and the third type of windshield wiper arm comprises a pin-type wiper arm.

4. The system of claim 3, wherein the second type of windshield wiper arm comprises a hookslot wiper arm having a larger hook and the first type of windshield wiper arm comprises a hookslot wiper arm having a smaller hook.

5. The system of claim 4, wherein the second type of windshield wiper arm comprises a 9 mm×4 mm hookslot wiper arm and the first type of windshield wiper arm comprises a hookslot wiper arm having a hook smaller than 4 mm.

6. The system of claim 4, wherein the connector comprises:

a side wall defining a hole sized to receive a pin of a pin-type wiper arm;
a movable beam positioned relative to the hole in the side wall so that the beam engages the pin of the pin-type wiper arm when the pin is received in the hole to secure the connector to the pin-type wiper arm; and a tab extending from the movable beam and positioned so that the tab engages a slot of a hookslot wiper arm when the hookslot wiper arm is attached to the connector to secure the connector to the hookslot wiper arm.

7. The system of claim 6, wherein the connector further comprises:

a second side wall; and an upper wall extending between the first and second side walls.

8. The system of claim 7, wherein:

the adapter includes an upper wall and is configured to fit atop the upper wall of the connector when the adapter is attached to the connector; and when the adapter is attached to the connector, a distance between the upper wall of the adapter and the movable beam is greater than a distance between the upper wall of the connector and the movable beam.

9. The system of claim 8, wherein the upper wall of the connector includes an opening and wherein the adapter includes a mechanism configured to fit within the opening to secure the adapter to the connector.

10. The system of claim 9, wherein the mechanism comprises a pair of hooked arms.

11. The system of claim 7, wherein the side walls of the connector extend above the upper wall to define a channel along the top of the connector, the channel securing a portion of a hookslot wiper arm when the connector is attached to the hookslot wiper arm.

12. The system of claim 11, wherein the adapter is configured to fit within the channel of the connector and to define a second channel along the top of the adapter, the second channel securing a portion of a larger hook hookslot wiper arm when the connector is attached to the larger hook hookslot wiper arm.

13. The system of claim 6, wherein the tab is located on a first side of the movable beam and the movable beam is positioned so that a second side of the movable beam engages the pin of the pin-type wiper arm when the connector is attached to the pin-type wiper arm.

14. The system of claim 6, wherein the movable beam is positioned relative to the hole so that the beam partially blocks a path extending from the hole.

15. The system of claim 4, wherein the carrier further comprises a post and wherein the connector further comprises a snap-fit latch attached to the post.

16. The system of claim 4, wherein the connector comprises:

a pin support having a support axis and a mechanism to secure the connector to a pin of a pin-type wiper arm with a longitudinal axis of the pin in line with the support axis and the pin restrained against axial motion, and a hook support having a mechanism to secure a hook of a hookslot wiper arm against longitudinal motion with the pin support axis being perpendicular to the length of the hookslot wiper arm and in a space defined within the hook.

17. The system of claim 4, wherein the connector comprises:

a mechanism configured to secure the connector to a either a pin-type wiper arm or a hookslot wiper arm, and a tab that is movable between one position in which the connector may be mounted on a pin-type wiper arm and a second position in which the connector may be mounted on a hookslot wiper arm.

18. The system of claim 3, wherein the second type of windshield wiper arm comprises a straight wiper arm.

19. The system of claim 18, wherein the connector comprises:

a side wall defining a hole sized to receive a pin of a pin-type wiper arm;

a movable beam positioned relative to the hole in the side wall so that the beam engages the pin of the pin-type wiper arm when the pin is received in the hole to secure the connector to the pin-type wiper arm; and a tab extending from the movable beam and positioned so that the tab engages a slot of a hookslot wiper arm when the hookslot wiper arm is attached to the connector to secure the connector to the hookslot wiper arm.

20. The system of claim 19, wherein the adapter comprises:

a first end configured to be attached to a straight wiper arm; and a second end having a hook configured to be attached to the connector, the hook including a slot positioned to engage the tab of the connector when the adapter is attached to the connector to secure the adapter to the connector.

21. The system of claim 20, wherein the first end of the adapter includes a channel configured to receive an end of a straight wiper arm.

22. The system of claim 21, wherein the channel includes an opening configured to engage a tab positioned near the end of the straight wiper arm.

23. The system of claim 22, wherein the opening is formed in an end of a movable beam formed in a wall of the channel.

24. The system of claim 20, wherein the connector further comprises:

a second side wall; and an upper wall extending between the first and second side walls, wherein the side walls extend above the upper wall to define a channel along the top of the connector, the channel securing a portion of the adapter when the adapter is attached to the connector.

25. The system of claim 1, wherein the first type of windshield wiper arm comprises a hookslot wiper arm having a smaller hook and the second type of windshield wiper arm comprises a hookslot wiper arm having a larger hook.

26. The system of claim 25, wherein the second type of windshield wiper arm comprises a 9 mm×4 mm hookslot wiper arm and the first type of windshield wiper arm comprises a hookslot wiper arm having a hook smaller than 4 mm.

27. The system of claim 25, wherein the connector comprises:

a movable beam; and a tab extending from the movable beam and positioned so that the tab engages a slot of a hookslot wiper arm when the hookslot wiper arm is attached to the connector to secure the connector to the hookslot wiper arm.

28. The system of claim 27, wherein the connector further comprises:

a second side wall; and an upper wall extending between the first and second side walls.

29. The system of claim 28, wherein:

the adapter includes an upper wall and is configured to fit atop the upper wall of the connector when the adapter is attached to the connector; and when the adapter is attached to the connector, a distance between the upper wall of the adapter and the movable beam is greater than a distance between the upper wall of the connector and the movable beam.

30. The system of claim 29, wherein the upper wall of the connector includes an opening and wherein the adapter includes a mechanism configured to fit within the opening to secure the adapter to the connector.

31. The system of claim 30, wherein the mechanism comprises a pair of hooked arms.

32. The system of claim 28, wherein the side walls of the connector extend above the upper wall to define a channel along the top of the connector, the channel securing a portion of a hookslot wiper arm when the connector is attached to the hookslot wiper arm.

33. The system of claim 32, wherein the adapter is configured to fit within the channel of the connector and to define a second channel along the top of the adapter, the second channel securing a portion of a larger hook hookslot wiper arm when the connector is attached to the larger hook hookslot wiper arm.

34. The system of claim 1, wherein the carrier further comprises a post and wherein the connector further comprises a snap-fit latch attached to the post.

35. The system of claim 1, wherein the first type of windshield wiper arm comprises a hookslot wiper arm and the second type of windshield wiper arm comprises a straight wiper arm.

36. The system of claim 35, wherein:

the adapter comprises:
a first end configured to be attached to a straight wiper arm, and
a second end having a hook configured to be attached to the connector, the hook including a slot; and the connector comprises:
a movable beam; and
a tab extending from the movable beam and positioned so that the tab engages the slot of the adapter when the adapter is attached to the connector to secure the adapter to the connector.

37. The system of claim 36, wherein the first end of the adapter includes a channel configured to receive an end of a straight wiper arm.

38. The system of claim 37, wherein the channel includes an opening configured to engage a tab positioned near the end of the straight wiper arm.

39. The system of claim 38, wherein the opening is formed in an end of a movable beam formed in a wall of the channel.

40. The system of claim 36, wherein the connector further comprises:

a second side wall; and an upper wall extending between the first and second side walls, wherein the side walls extend above the upper wall to define a channel along the top of the connector, the channel securing a portion of the adapter when the adapter is attached to the connector.

41. A windshield wiper blade assembly system for attachment to different types of windshield wiper arms, comprising:

a windshield wiper blade assembly including:
a windshield wiper blade connector configured to be connected to a hookslot wiper arm having a smaller hook,
a windshield wiper blade carrier attached to the connector, and
a windshield wiper blade attached to the windshield wiper blade carrier; and an adapter comprising a piece physically separate from the connector and directly attached to the connector to permit connection of the windshield wiper blade assembly to a hookslot wiper arm having a larger hook without detaching the carrier from the connector.

42. The system of claim 41, further comprising a second adapter configured to be attached to the connector to permit connection of the windshield wiper blade assembly to a straight wiper arm without detaching the carrier from the connector.

43. The system of claim 41, wherein the connector also is configured to be connected to a pin-type wiper arm.

44. The system of claim 41, wherein the adapter is configured to permit connection of the windshield wiper blade assembly to a 9 mm×4 mm hookslot wiper arm and the connector is configured to permit connection of the windshield wiper blade assembly to a hookslot wiper arm having a hook smaller than 4 mm.

45. A method of attaching a windshield wiper blade assembly to a first type of windshield wiper arm, comprising:

providing a windshield wiper blade assembly that includes a windshield wiper blade connector configured to be connected to a second type of windshield wiper arm, a windshield wiper blade carrier attached to the connector, and a windshield wiper blade attached to the windshield wiper blade carrier;

providing an adapter comprising a piece physically separate from the connector and directly connected to the connector and to the first type of windshield wiper arm;

attaching the adapter to the connector; and attaching the windshield wiper blade assembly to a windshield wiper arm of the first type.

* * * * *